(12) United States Patent
Islam

(10) Patent No.: US 6,356,384 B1
(45) Date of Patent: Mar. 12, 2002

(54) BROADBAND AMPLIFIER AND COMMUNICATION SYSTEM

(75) Inventor: Mohammed N. Islam, Allen, TX (US)

(73) Assignee: Xtera Communications Inc., Allen, TX (US)

( * ) Notice: Subject to any disclaimer, the term of this patent is extended or adjusted under 35 U.S.C. 154(b) by 0 days.

(21) Appl. No.: 09/547,165

(22) Filed: Apr. 11, 2000

Related U.S. Application Data

(63) Continuation-in-part of application No. 09/470,831, filed on Dec. 23, 1999, and a continuation-in-part of application No. 09/471,752, filed on Dec. 23, 1999, and a continuation-in-part of application No. 09/046,900, filed on Mar. 24, 1998.

(51) Int. Cl.[7] .................................................. H01S 3/00
(52) U.S. Cl. .......................................... 359/334; 372/3
(58) Field of Search ............................. 372/3; 359/334, 359/337.5, 341.1, 349

(56) References Cited

U.S. PATENT DOCUMENTS

| | | | |
|---|---|---|---|
| 4,063,106 A | 12/1977 | Ashkin et al. | 307/88.3 |
| 4,685,107 A | 8/1987 | Kafka et al. | 372/6 |
| 4,740,974 A | 4/1988 | Byron | 372/3 |
| 4,831,616 A | 5/1989 | Huber | 370/3 |
| 5,039,199 A | 8/1991 | Mollenauer et al. | 359/334 |
| 5,050,183 A | 9/1991 | Duling, III | 372/94 |
| 5,058,974 A | 10/1991 | Mollenauer | 385/27 |
| 5,107,360 A | 4/1992 | Huber | 359/124 |
| 5,117,196 A | 5/1992 | Epworth et al. | 359/333 |
| 5,132,976 A | 7/1992 | Chung et al. | 372/6 |
| 5,134,620 A | 7/1992 | Huber | 372/6 |
| 5,140,456 A | 8/1992 | Huber | 359/341 |
| 5,151,908 A | 9/1992 | Huber | 372/6 |
| 5,153,762 A | 10/1992 | Huber | 359/125 |
| 5,159,601 A | 10/1992 | Huber | 372/6 |
| 5,166,821 A | 11/1992 | Huber | 359/238 |

(List continued on next page.)

OTHER PUBLICATIONS

Srivastava et al., "System margin enhancement with Raman gain in Multi–span WDM transmission," FC2–1, Proceeding OFC–IOOC 1999, OFC'99 Technical Digest, (Feb. 26, 1999).*

Sun et al., "A Gain–Flattened Ultra Wide Band EDFA For High Capacity WDM Optical Communications Systems", Optical Communications, 1998. 24th European Conference, pp. 53–54.*

Hansen et al., "Loss compensation in dispersion compensating fiber modules by Raman amplification", Optical Fiber Communication Conference, 1998.*

Yonenaga et al., "Dispersion–managed high–capacity WDM systems using zero–dispersion–flattened transmission line", FD4–1, Proceedinng of OFC–IOOC 1999, San Diego, California, p. 71–73.*

(List continued on next page.)

Primary Examiner—Thomas H. Tarcza
Assistant Examiner—Deandra M. Hughes
(74) Attorney, Agent, or Firm—Wilson Sonsini Goodrich & Rosati

(57) ABSTRACT

A method of broadband amplification divides an optical signal of wavelength of 1430 nm to 1620 nm at a preselected wavelength into a first beam and a second beam. The first beam is directed to at least one optical amplifier and produces an amplified first beam. The second beam is directed to at least one rare earth doped fiber amplifier to produce an amplified second beam. The first and second amplified beams are combined.

24 Claims, 20 Drawing Sheets

U.S. PATENT DOCUMENTS

| | | | | |
|---|---|---|---|---|
| 5,187,760 A | 2/1993 | Huber | ......................... | 385/37 |
| 5,191,586 A | 3/1993 | Huber | ......................... | 372/6 |
| 5,191,628 A | 3/1993 | Byron | ......................... | 385/27 |
| 5,200,964 A | 4/1993 | Huber | ......................... | 372/26 |
| 5,208,819 A | 5/1993 | Huber | ......................... | 372/32 |
| 5,210,631 A | 5/1993 | Huber et al. | ............... | 359/132 |
| 5,212,579 A | 5/1993 | Huber et al. | ............... | 359/182 |
| 5,218,655 A | 6/1993 | Mizrahi | ....................... | 385/39 |
| 5,222,089 A | 6/1993 | Huber | ......................... | 372/6 |
| 5,225,925 A | 7/1993 | Grubb et al. | ............... | 359/341 |
| 5,226,049 A | 7/1993 | Grubb | ......................... | 372/6 |
| 5,243,609 A | 9/1993 | Huber | ......................... | 372/9 |
| 5,257,124 A | 10/1993 | Glaab et al. | ............... | 359/124 |
| 5,268,910 A | 12/1993 | Huber | ......................... | 372/6 |
| 5,271,024 A | 12/1993 | Huber | ......................... | 372/6 |
| 5,283,686 A | 2/1994 | Huber | ......................... | 359/337 |
| 5,293,545 A | 3/1994 | Huber | ......................... | 359/111 |
| 5,295,016 A | 3/1994 | Van Deventer | ............ | 359/347 |
| 5,295,209 A | 3/1994 | Huber | ......................... | 385/37 |
| 5,301,054 A | 4/1994 | Huber et al. | ............... | 359/132 |
| 5,321,543 A | 6/1994 | Huber | ......................... | 359/187 |
| 5,321,707 A | 6/1994 | Huber | ......................... | 372/6 |
| 5,323,404 A | 6/1994 | Grubb | ......................... | 372/6 |
| 5,331,449 A | 7/1994 | Huber et al. | ............... | 359/125 |
| 5,359,612 A | 10/1994 | Dennis et al. | ............... | 372/18 |
| 5,373,389 A | 12/1994 | Huber | ......................... | 359/195 |
| 5,389,779 A | 2/1995 | Betzig et al. | ............... | 250/216 |
| 5,400,166 A | 3/1995 | Huber | ......................... | 359/173 |
| 5,416,629 A | 5/1995 | Huber | ......................... | 359/182 |
| 5,450,427 A | 9/1995 | Fermann et al. | ............. | 372/18 |
| 5,467,212 A | 11/1995 | Huber | ......................... | 359/168 |
| 5,473,622 A | 12/1995 | Grubb | ......................... | 372/6 |
| 5,477,555 A | 12/1995 | Debeau et al. | ............... | 372/25 |
| 5,479,291 A | 12/1995 | Smith et al. | ............... | 359/333 |
| 5,485,481 A | 1/1996 | Ventrudo et al. | ............ | 372/6 |
| 5,497,386 A | 3/1996 | Fontana | ....................... | 372/18 |
| 5,504,609 A | 4/1996 | Alexander et al. | .......... | 359/125 |
| 5,504,771 A | 4/1996 | Vahala et al. | ............... | 372/94 |
| 5,513,194 A | 4/1996 | Froberg et al. | ............... | 372/6 |
| 5,521,738 A | 5/1996 | Froberg | ....................... | 359/184 |
| 5,530,710 A | 6/1996 | Grubb | ......................... | 372/6 |
| 5,532,864 A | 7/1996 | Alexander et al. | .......... | 359/177 |
| 5,541,947 A | 7/1996 | Mourou et al. | ............... | 372/25 |
| 5,542,011 A | 7/1996 | Robinson | ....................... | 385/24 |
| 5,555,118 A | 9/1996 | Huber | ......................... | 359/125 |
| 5,557,442 A | 9/1996 | Huber | ......................... | 359/179 |
| 5,577,057 A | 11/1996 | Frisken | ....................... | 372/18 |
| 5,579,143 A | 11/1996 | Huber | ......................... | 359/130 |
| 5,600,473 A | 2/1997 | Huber | ......................... | 359/179 |
| 5,617,434 A | 4/1997 | Tamura et al. | ............... | 372/6 |
| 5,623,508 A | 4/1997 | Grubb et al. | ............... | 372/3 |
| 5,659,351 A | 8/1997 | Huber | ......................... | 348/7 |
| 5,659,559 A | 8/1997 | Ventrudo et al. | ............ | 372/6 |
| 5,659,644 A | 8/1997 | DiGiovanni et al. | .......... | 385/31 |
| 5,673,280 A | 9/1997 | Grubb et al. | ............... | 372/3 |
| 5,673,281 A | 9/1997 | Byer | ......................... | 372/3 |
| 5,701,186 A | 12/1997 | Huber | ......................... | 359/125 |
| 5,726,784 A | 3/1998 | Alexander et al. | .......... | 359/125 |
| 5,734,665 A | 3/1998 | Jeon et al. | ..................... | 372/6 |
| 5,757,541 A | 5/1998 | Fidric | ....................... | 359/341 |
| 5,768,012 A | 6/1998 | Zanoni et al. | ............... | 359/341 |
| 5,798,855 A | 8/1998 | Alexander et al. | .......... | 359/177 |
| 5,825,520 A | 10/1998 | Huber | ......................... | 359/130 |
| 5,838,700 A | 11/1998 | Dianov et al. | ............... | 372/6 |
| 5,841,797 A | 11/1998 | Ventrudo et al. | ............ | 372/6 |
| 5,847,862 A | 12/1998 | Chraplyvy et al. | .......... | 359/337 |
| 5,861,981 A | 1/1999 | Jabr | ......................... | 359/341 |
| 5,880,866 A | 3/1999 | Stolen | ....................... | 359/138 |
| 5,883,736 A | 3/1999 | Oshima et al. | ............... | 359/341 |
| 5,887,093 A | 3/1999 | Hansen et al. | ............... | 385/27 |
| 5,905,838 A * | 5/1999 | Judy et al. | ................... | 385/123 |
| 5,920,423 A | 7/1999 | Grubb et al. | ............... | 359/341 |
| 6,052,393 A * | 4/2000 | Islam | ......................... | 372/6 |
| 6,151,160 A * | 11/2000 | Ma et al. | ................... | 359/341 |

OTHER PUBLICATIONS

Sun, Y. et al., "80nm Ultra–Wideband Erbium–Doped Silicia Fibre Amplifier" Electronics Letters, Nov. 6, 1997, vol. 33, No. 23, pp. 1965–1967.

Wysocki, P.F. et al., "Broad–Band Erbium–Doped Fiber Amplifier Flattened Beyond 40nm Using Long–Period Grating Filter", IEEE Photonics, vol. 9, No. 10, Oct. 10, 1997, pp. 1343–1345.

Liaw, S–K et al., "Passive Gain–Equilized Wide–Band Erbium–Doped Fiber Amplifier Using Samarium–Doped Fiber", IEEE Photonics Technology: Letters, vol. 8, No. 7, Jul. 7, 1996, pp. 879–881.

Yamada, M. et al., "A Low–Noise and Gain–Flattened Amplifier Composed of a Silica–Based and a Fluoride–Based Er3+–Doped Fiber Amplifierin a Cascade Configuration", IEEE Photonics Letters, vol. 8, No. 5, May 1996, pp. 620–622.

Ma, M.X. et al., "240–km Repeater Spacing in a 5280–km WDM System Experiment Using 8×2.5 Gb/s NRZ Transmission", IEEE Photonics Technology Letters, vol. 10, No. 6, Jun. 1998, pp. 893–895.

Masuda, H. et al., "Ultrawide 75–nm 3–dB Gain–Band Optical Amplification with Erbium–Doped Fluoride Fiber Amplifiers and Distrbuted Raman Amplifiers", IEEE Photonics Technology Letters, vol. 10, No. 4, Apr. 1998, pp. 516–518.

Masuda, H. et al., "Wide–Band and Gain Flattened Hybrid Fiber Amplifier Consisting of an EDFA and a Multiwavelength Pumped Raman Amplifier", IEEE Photonics Technology Letters, vol. 11, No. 6, Jun. 1999, pp. 647–649.

Kawaii, S. et al., "Ultra–Wide, 75nm 3dB Gain–Band Optical Amplifier Utilising Gain–Flattened Erbium–Doped Fluoride Fibre Amplifier and Discrete Raman Amplification", Electronic Letters, vol. 34, No. 9, Apr. 30, 1998, pp. 897–898.

Kawai, S. et al., "Ultrawide, 75nm 3dB Gain–Band Optical Amplifier Utilizing Erbium–Doped Fluoride Fiber and Raman Fiber", OFC Technical Digest, 1998.

Kidorf, H. et al., "Pump Interactions in a 100–nm Bandwidth Raman Amplifier", IEEE Electronics Technology Letters, vol. 11, No. 5, May 1999, pp. 530–532.

Ono, H. et al., "Gain–Flattened Er3+–Doped Fiber Amplifier for a WDM Signal in the 1.57–1.60–$\mu$m Wavelength Region", IEEE Photonics Technology Letters, vol. 9, No. 5, May 1997, pp. 596–598.

Hansen, P.B. et al., "529km Unrepeatered Transmission at 2.488 Gbit/s Using Dispersion Compensation, Forward Error Correction, and Remote Post–and Pre–amplifiers Pumped By Diode–Pumped Raman Lasers", IEEE Electronics Letters Online No. 19951043, Jul. 7, 1998.

Guy, M.J. et al., "Lossless Transmission of 2ps Pulses Over 45km of Standard Fibre at 1.3$\mu$m Using Distributed Raman Amplification", Electronics Letters, vol. 34, No. 8, Apr. 6, 1998, pp. 793–794.

Dianov, E.M. et al., "Highly Efficient 1.3$\mu$m Raman Fibre amplifier", Electronics Letters, vol. 34, No. 7, Apr. 2, 1998, pp. 669–670.

Chernikov, S.V. et al., "Raman Fibre Laser Operating at 1.24μm", Electronics Letters, vol. 34, No. 7, Apr. 2, 1998, pp. 680–681.

Liaw, S–K et al., "Passive Gain–Equilized Wide–Band Erbium–Doped Fiber Amplifier Using Samarium–Doped Fiber", IEEE Photonics Technology Letters, vol. 8, No. 7, Jul. 1996, pp. 879–881.

Masuda, M. et al., "Wideband, Gain–Flattened, Erbium–Doped Fibre Amplifiers with 3dB Bandwidths of >50nm", Electronics Letters, vol. 33, No. 12, Jun. 5, 1997, pp. 1070–1072.

Yang, F.S. et al., "Demonstration of Two–Pump Fibre Optical Parametric Amplification", Electronics Letters, vol. 33, No. 21, Oct. 9, 1997, pp. 1812–1813.

Kawai, S. et al., "Wide–Bandwidth and Long–Distance WDM Transmission Using Highly Gain–Flattened Hybrid Amplifier", IEEE Photonics Technology Letters, vol. 11, No. 7, Jul. 1999, pp. 886–888.

Paschotta, R. et al., "Ytterbium–Doped Fiber Amplifiers", IEEE Journal Of Quantum Electronics, vol. 33, No. 7, Jul. 1997, pp. 1049–1056.

Chernikov, S.V. et al., "Raman Fibre Laser Operating at 1.24 μm" Electronics Letters, vol. 34, No. 7, Apr. 2, 1998, pp. 680–681.

Grubb, S.G. et al., "Fiber Raman Lasers Emit at Many Wavelengths", Laser Focus World, Feb. 1996, pp. 127–134.

Mollenauer, L.F. et al., "Dispersion–Managed Solitons for Terrestrial Transmission", Optical Society Of America, 1999.

Hansen, S. L. et al., "Gain Limit in Erbium–Doped Fiber Amplifiers Due to Internal Rayleigh Backscattering", IEEE Photonics Technology Letters, vol. 4, No. 6, Jun. 1992, pp. 559–561.

Spirit, D.M. et al., "Systems Aspects of Raman Fibre Amplifiers", Optical Amplifiers For Communication, vol. 137, Pt. J, No. 4, Aug. 1990, pp. 221–224.

Mollenenauer, L.F. et al. "Soliton Propagation in Long Fibers with Periodically Compensated Loss", IEEE Journal Of Quantum Electronics, vol. QE–22, No. 1, Jan. 1986, pp. 157–173.

Marhic, M.E. et al., "Cancellation of Stimulated–Raman––Scattering Cross Talk in Wavelength–Division–Multiplexed Optical Communication Systems by Series or Parallel Techniques", Optical Society Of America, 1998, vol. 15, No. 3, pp. 958–963.

Hansen, P.B. et al., "Rayleigh Scattering Limitations in Distrigbuted Raman Pre–Amplifiers", IEEE Photonics Technology Letters, vol. 10, No. 1, Jan. 1998, pp. 159–161.

Ikeda, M., "Stimulated Raman Amplification Characteristics in Long Span Single–Mode Silica Fibers", Optics Communications, vol. 39, No. 3, 1981, pp. 148–152.

Solbach, K. et al., "Performance Degradation Due to Stimulated Raman Scattering in Wavelength–Division–Multiplexed Optical–Fibre Systems", Electronics Letters, vol. 19, No. 6, Aug. 4, 1983, pp. 641–643.

Grandpierre, A.G. et al., "Theory of Stimulated Raman Scattering Cancellation in Wavelength–Division–Multiplexed Systems via Spectral Inversion", IEEE Photonics Technology Letters, vol. 11, No. 10, Oct. 1999, pp. 1271–1273.

Chinn, S.R. "Analysis of Counter–Pumped Small–Signal Fibre Raman Amplifiers", Electronics Letters, vol. 33, No. 7, Mar. 27, 1997, pp. 607–608.

Stolen, R.H. et al., "Raman Gain in Glass Optical Waveguides", Appl. Phys. Lett. vol. 22, No. 6, Mar. 15, 1973, pp. 276–278.

Stolen, R.H. et al., "Development of the Stimulated Raman Spectrum in Single–Mode Silica Fibers", Optical Society Of America, vol. 1, No. 4, Aug. 1984, pp. 662–667.

Nissov, M. et al., "100 Gb/s (10×10Gb/s) WDM Transmission Over 7200 km Using Distributed Raman Amplification", Center For Broadband Telecommunications, pp. 9–12.

Takachio, N. et al., "32×10 Gb/s Distributed Raman Amplification Transmission with 50–GHz Channel Spacing in the Zero–Dispersion Region over 640km of 1.55–μm Dispersion–shifted Fiber", NTT Labs.

* cited by examiner

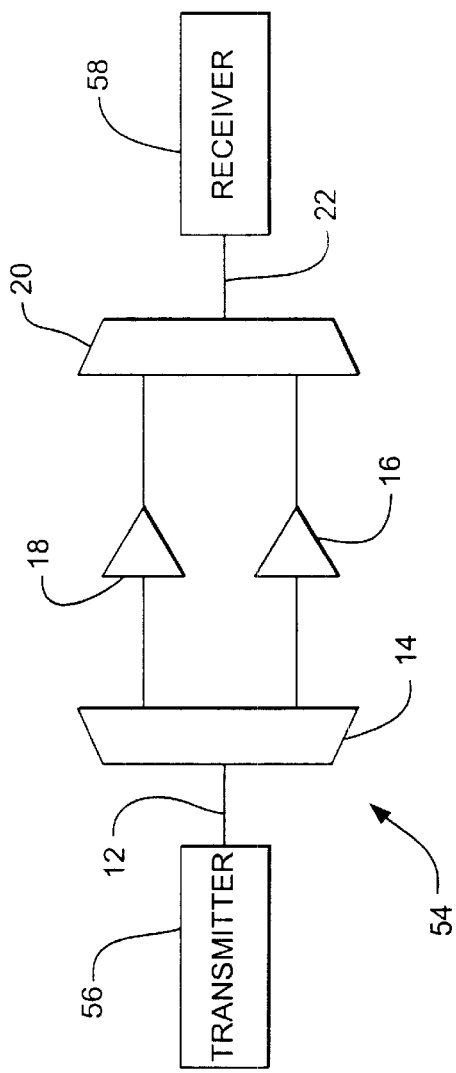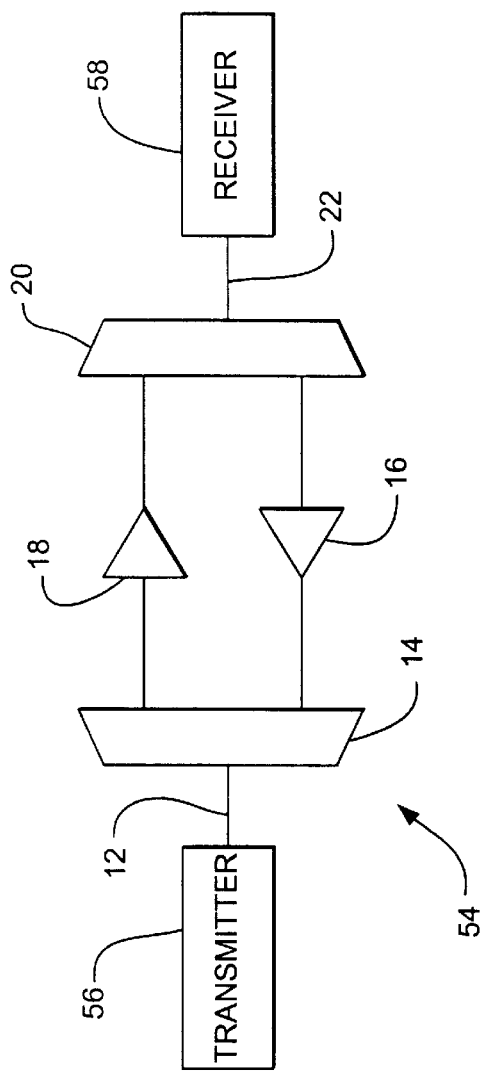
FIG. 5A
FIG. 5B

BROADBAND AMPLIFIER AND COMMUNICATION SYSTEM

CROSS-REFERENCE TO RELATED APPLICATION

This application is a continuation-in-part of Ser. No. 09/046,900, filed Mar. 24, 1998, and a continuation-in-part of Ser. No. 09/471,752 and 09/470,831, both filed Dec. 23, 1999, identified as Attorney Docket No. 20434-704, both of which are fully incorporated herein by reference.

BACKGROUND

1. Field of the Invention

The present invention relates generally to broadband amplifiers and communication systems, and more particularly to broadband booster amplifiers and communication systems with Raman and rare-earth doped amplifiers.

2. Description of Related Art

Because of the increase in data intensive applications, the demand for bandwidth in communications has been growing tremendously. In response, the installed capacity of telecommunication systems has been increasing by an order of magnitude every three to four years since the mid 1970s. Much of this capacity increase has been supplied by optical fibers that provide a four-order-of-magnitude bandwidth enhancement over twisted-pair copper wires.

To exploit the bandwidth of optical fibers optical amplifiers and wavelength-division multiplexing (WDM) have been developed and utilized in optical communications. Optical amplifiers boost the signal strength and compensate for inherent fiber loss and other splitting and insertion losses. WDM enables different wavelengths of light to carry different signals parallel over the same optical fiber. Although WDM is critical in that it allows utilization of a major fraction of the fiber bandwidth, it would not be cost-effective without optical amplifiers. In particular, a broadband optical amplifier that permits simultaneous amplification of many WDM channels is a key enabler for utilizing the full fiber bandwidth.

Silica-based optical fiber has its lowest loss window around 1550 nm with approximately 25 THz of bandwidth between 1430 and 1620 nm. In this wavelength region, erbium-doped fiber amplifiers (EDFAs) are widely used. However, the absorption band of a EDFA nearly overlaps its the emission band. For wavelengths shorter than about 1525 nm, erbium-atoms in typical glasses will absorb more than amplify. To broaden the gain spectra of EDFAs. various dopings have been added. Co-doping of the silica core with aluminum or phosphorus broadens the emission spectrum considerably. Nevertheless the absorption peak for the various glasses is still around 1530 nm.

Broadening the bandwidth of EDFAs to accommodate a larger number of WDM channels has become a subject of intense research. A two-band architecture for an ultra-wideband EDFA has been developed with an optical bandwidth of 80 nm. To obtain a low noise figure and high output power, the two bands share a common first gain section and have distinct second gain sections. The 80 nm bandwidth comes from one amplifier (so-called conventional band or C-band) from 1525.6 to 1562.5 nm and another amplifier (so-called long band or L-band) from 1569.4 to 1612.8 nm.

These recent developments illustrate several points in the search for broader bandwidth amplifiers for the low-loss window in optical fibers. First, even with EDFAs, bandwidth in excess of 40–50 nm requires the use of parallel combination of amplifiers. Second, the 80 nm bandwidth may be very close to the theoretical maximum. The short wavelength side at about 1525 nm is limited by the inherent absorption in erbium, and long wavelength side is limited by bend-induced losses in standard fibers at above 1620 nm. Therefore, even with these recent advances, half of the bandwidth of the low-loss window. i.e. 1430–1530 nm, remains without an optical amplifier.

There is a need for a broadband amplifier and broadband communication system suitable for a wide range of wavelengths.

SUMMARY OF THE INVENTION

Accordingly, an object of the present invention is to provide a method of broadband amplification that divides an optical signal with a wavelength of 1430 mn to 1620 nm at a preselected wavelength into a first beam and a second beam.

Another object of the present invention is to provide a method of broadband communication that propagates a plurality of WDM wavelengths, with at least a portion of the WDM wavelengths in the range of 1430 to 1530 nm, from a transmitter assembly along a transmission line.

Yet another object of the present invention is to provide a method of broadband communication that propagates a first plurality of WDM wavelengths in the wavelength range of 1530 to 1620 from a transmitter assembly along a transmission line, and introduces a second plurality of WDM wavelengths in the wavelength range of 1430 to 1530 to the transmission line.

In another embodiment of the present invention, a method of broadband amplification divides an optical signal of wavelength of 1430 nm to 1620 nm at a preselected wavelength into a first beam and a second beam. The first beam is directed to at least one optical amplifier and produces an amplified first beam. The second beam is directed to at least one rare earth doped fiber amplifier to produce an amplified second beam. The first and second amplified beams are combined.

In another embodiment of the present invention, a method transmitting WDM wavelengths in a broadband communication system includes propagating a plurality of WDM wavelengths from a transmitter assembly along a transmission line. At least a portion of the WDM wavelengths are in the wavelength range of 1430 to 1530 nm. At least a portion of the plurality of wavelengths are amplified with a Raman amplifier assembly to create a plurality of amplified WDM wavelengths. The plurality of amplified WDM wavelengths are received at a receiver assembly.

In another embodiment, a method of transmitting WDM wavelengths propagates a first plurality of WDM wavelengths in the wavelength range of 1530 to 1620 from a transmitter assembly along a transmission line. A second plurality of WDM wavelengths in the wavelength range of 1430 to 1530 is introduced to the transmission line; The second plurality of WDM wavelengths are amplified by Raman amplification after the second plurality of WDM wavelengths are introduced to the transmission line The first and second pluralities of WDM wavelengths are received at a receiver assembly.

In another embodiment of the present invention a method of transmitting WDM wavelengths in a broadband communication system includes, propagating a plurality of WDM wavelengths from a transmitter assembly along a transmission line. At least a portion of the plurality of WDM wavelengths are in the wavelength range of 1430 to 1530 nm. A portion of the plurality of wavelengths are amplified with a Raman amplifier assembly to create a plurality of amplified WDM wavelengths that are received at a receiver assembly.

In another embodiment of the present invention, a method of transmitting WDM wavelengths in a broadband communication system includes propagating a first plurality of WDM wavelengths in the wavelength range of 1530 to 1620 from a transmitter assembly along a transmission line. A second plurality of WDM wavelengths in the wavelength range of 1430 to 1530 are introduced to the transmission line. The second plurality of WDM wavelengths are amplified by Raman amplification after the second plurality of WDM wavelengths are introduced to the transmission line. The first and second pluralities of WDM wavelengths are received at a receiver assembly.

BRIEF DESCRIPTION OF THE DRAWINGS

FIGS. 5(a) through 11(b) are schematic diagrams illustrating different embodiments of broadband communication systems of the present invention.

DETAILED DESCRIPTION OF PREFERRED EMBODIMENTS

In various embodiments, the present invention provides parallel optical amplification with a combination of optical amplifiers. This parallel optical amplification can include two parallel stages of Raman and rare-earth doped optical amplifiers.

Figure 1A:
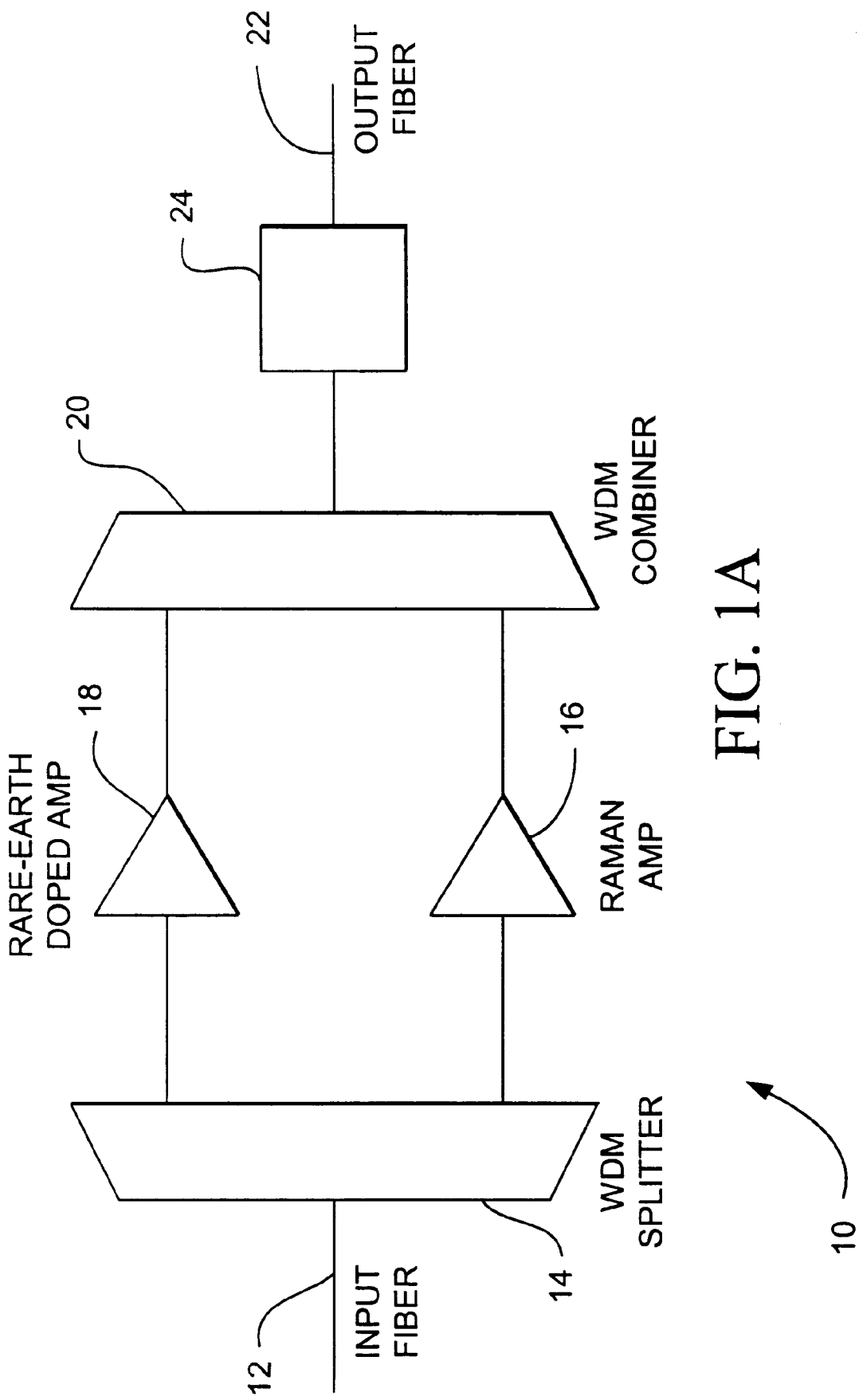
FIG. 1(a) is a schematic diagram of one embodiment of a broadband amplifier of the present invention with a parallel geometric combination of Raman and rare-earth doped amplifiers.
Figure 1B:
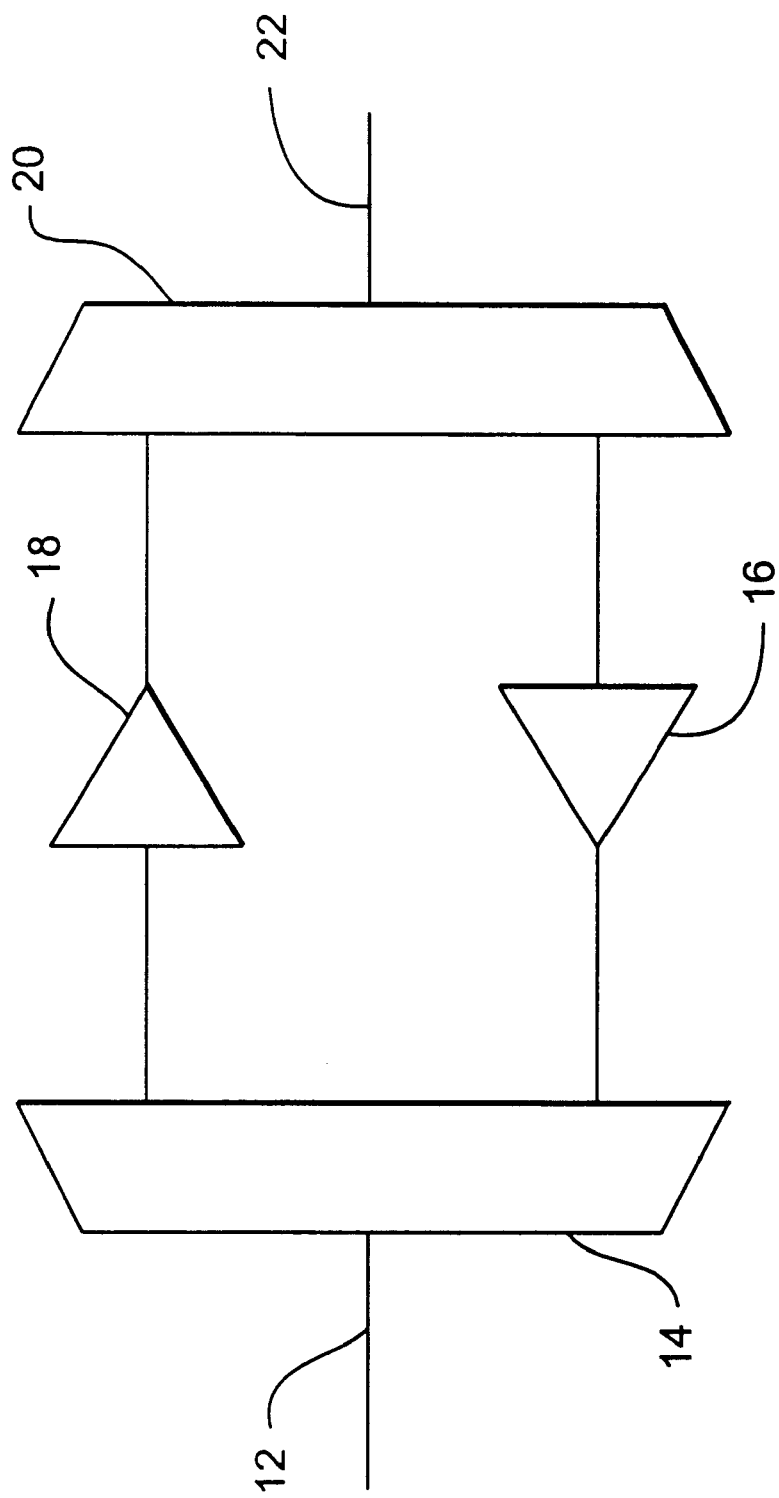
FIG. 1(b) is a schematic diagram of another embodiment of a broadband amplifier of the present invention with a parallel geometric combination of Raman and rare-earth doped amplifiers.

Referring now to FIGS. 1(a) and 1(b), Amplifier 10 (FIG. 1(a)) and amplifier 11 (FIG. 1(b)) each include at least one input fiber 12 coupled to a splitter 14. Examples of splitters include WDM couplers, fused tapered couplers, Mach-Zehnder interferometers, gratings and circulators, and the like. Splitter 14 divides an optical signal having a wavelength between 1430 nm and 1620 nm at a predetermined wavelength, preferably at 1525 nm, into at least a first wavelength and a second wavelength. A Raman amplifier 16 and a rare-earth doped optical amplifier 18 are coupled to splitter 14 and arranged in a parallel manner. Raman amplifier 16 receives the first band and produces an amplified broadband first band. Rare-earth doped optical amplifier 18 receives the second band and produces an amplified broadband second band.

A combiner 20 is coupled to Raman amplifier 16 and rare-earth doped optical amplifier 18. Combiner 20 combines the amplified and spectrally broadened first and second bands to produce an amplified broadband optical signal. A transition from a stop band to a pass band of combiner 20 occurs in preferably 20 nm or less, more preferably 15 nm or less and most preferably 10 nm or less. An output fiber 22 is coupled to combiner 20. Preferably splitter 14 and combiner 20 are WDM couplers. An output fiber 22 is coupled to combiner 20.

In one embodiment, input fiber 12 transmits at least a first wavelength and a second wavelength. The first wavelength falls within a gain bandwidth of Raman amplifier 16 and the second wavelength falls within a gain bandwidth of rare-earth doped optical amplifier 18.

A gain tilt control device 24 can be coupled to splitter 14, Raman amplifier 16, rare-earth doped optical amplifier 18 or combiner 20. Suitable gain tilt control devices 24 include but are not limited to adjustable gain flattening filters, long period gratings, cascaded Mach-Zehnder filters. acousto-optic filter devices and the like.

In FIG. 1(a) Raman amplifier 16 and rare-earth doped amplifier 18 are arranged so that the first and second bands co-propagate In FIG. 1(b), Raman amplifier 16 and rare-earth doped amplifier 18 are arranged so that the first and second bands are counter-propagating. The counter-propagating reduces interaction between the first and second bands.

Figure 2A:
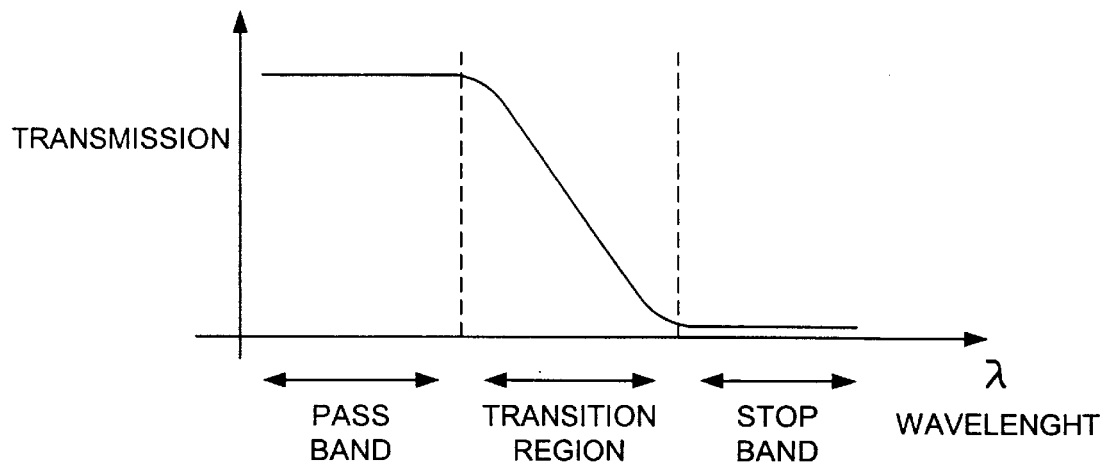
FIG. 2(a) is a graph illustrating that transmission of any two bands from the parallel geometric combinations of the Raman and rare-earth amplifiers of FIGS. 1(a) and 1(b) is a function of wavelength of combiners splitters.
Figure 2B:
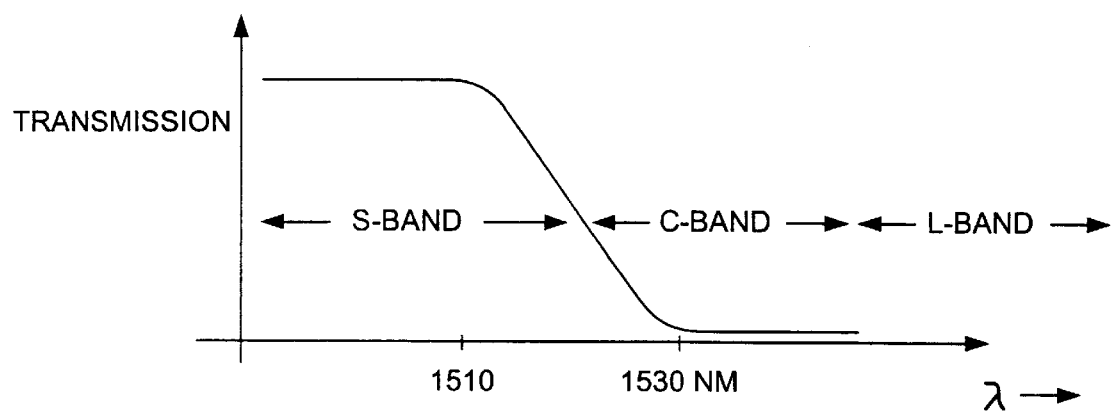
FIG. 2(b) is a graph illustrating that transmission of the C or L band and the S band from the parallel geometric combinations of the Raman and rare-earth amplifiers of FIGS. 1(a) and 1(b) is a function of wavelength of combiners splitters.

FIGS. 2(a) and 2(b) illustrate that in parallel geometric combinations of Raman amplifier 16 and rare-earth doped amplifier 18 transmission of the two bands is a function of wavelength of combiner 20 and splitter 14. FIG. 2(a) is generic for any two bands while FIG. 2(b) is specific to the S and C/L bands.

Figure 3A:
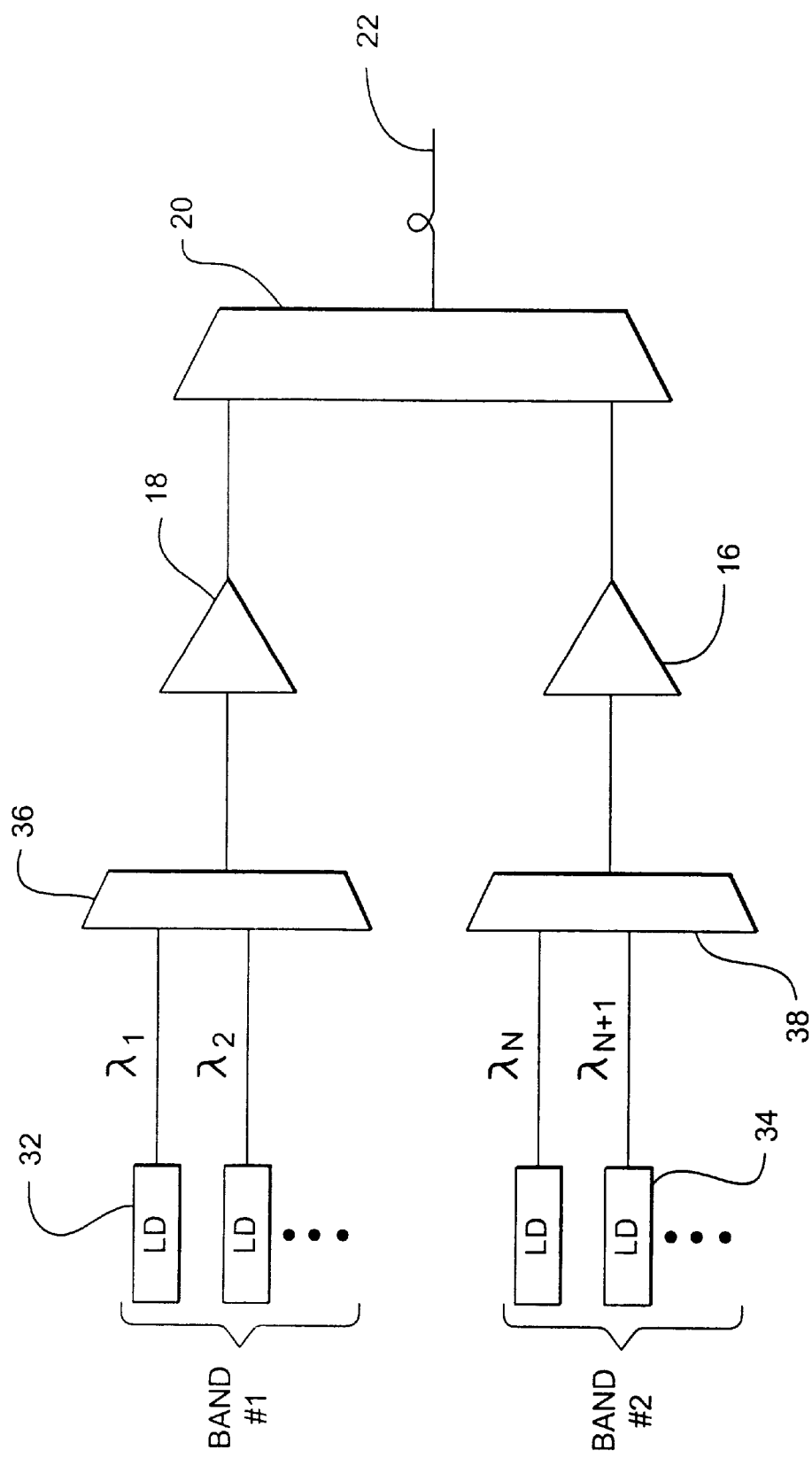
FIG. 3(a) is a schematic diagram of one embodiment of a broadband booster amplifier of the present invention.
Figure 3B:
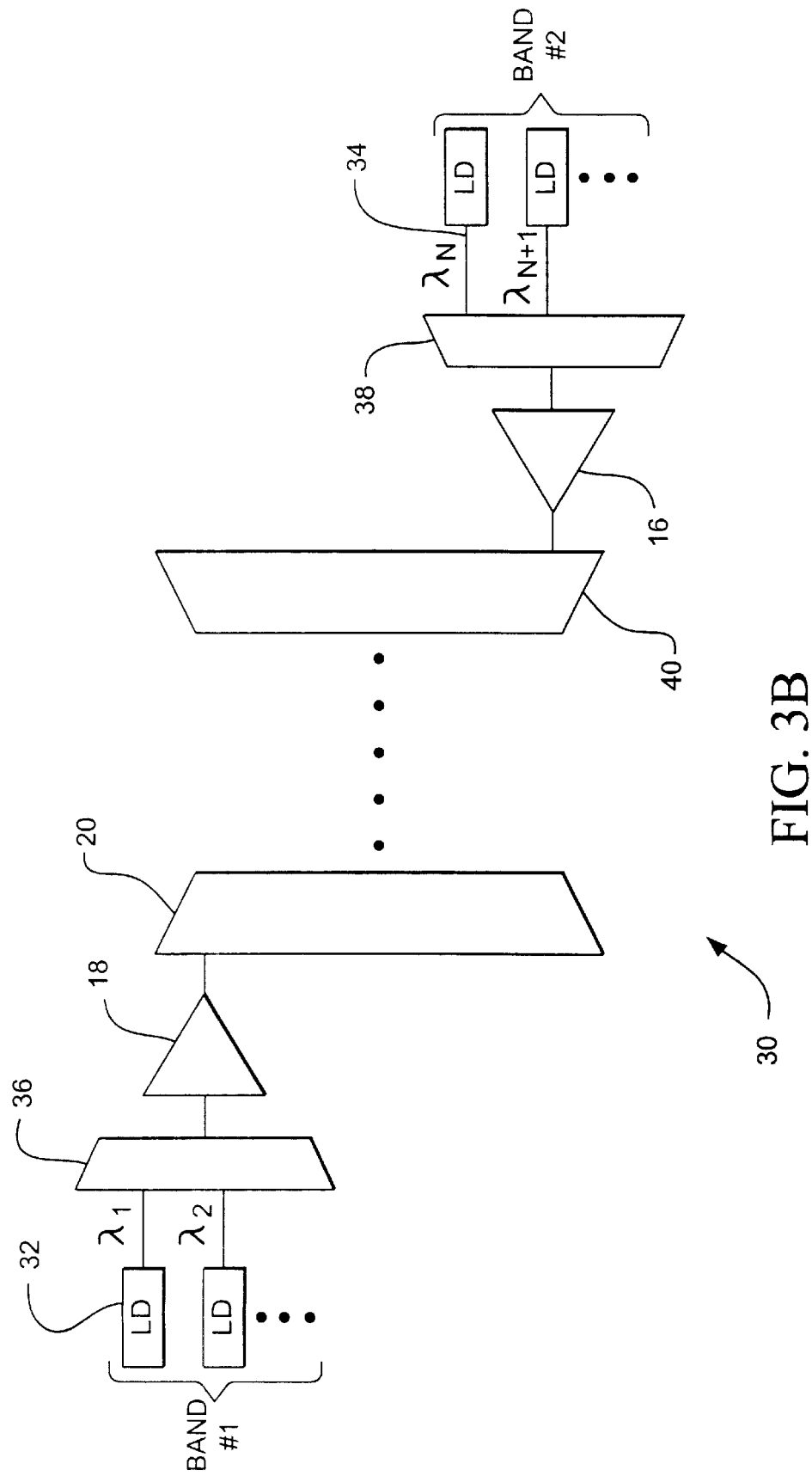
FIG. 3(b) is a schematic diagram of another embodiment of a broadband booster amplifier of the present invention.

FIGS. 3(a) and 3(b) illustrate broadband booster amplifier 30 embodiments of the present invention that include a first plurality of transmitters 32 that emits a first plurality of wavelengths, and a second plurality of transmitters 34 that transmit a second band of wavelengths. Raman amplifier 16 is coupled to the second plurality of transmitters 34 through a combiner 38. Raman amplifier 16 amplifies the first band of wavelengths. Rare-earth doped optical amplifier 18 is coupled to the plurality of transmitters 32 through a combiner 36. Rare-earth doped optical amplifier 18 amplifies the second band of wavelengths. Combiner 20 is coupled to Raman amplifier 16 and rare-earth doped optical amplifier 18. Combiner 20 combines an optical signal from Raman amplifier 16 and rare-earth doped amplifier 18 into at least a first wavelength and a second wavelength. A transition from a stop band to a pass band of combiner 20 occurs preferably in 20 nm or less, more preferably 15 nm or less and still more preferably 10 nm or less. Output fiber 22 is coupled to combiner 20. Gain tilt control device 24 can be coupled to Raman amplifier 16, rare-earth doped optical amplifier 18 or combiner 20. In FIG. 3(b), rare-earth doped amplifier 18 is coupled to combiner 20. Raman amplifier 16 is coupled to a combiner 40.

In FIG. 3(a) Raman amplifier 16 and rare-earth doped amplifier 18 are arranged so that the first and second bands co-propagate In FIG. 3(b), Raman amplifier 16 and rare-earth doped amplifier 18 are arranged so that the first and second bands are counter-propagating.

Figure 4A:
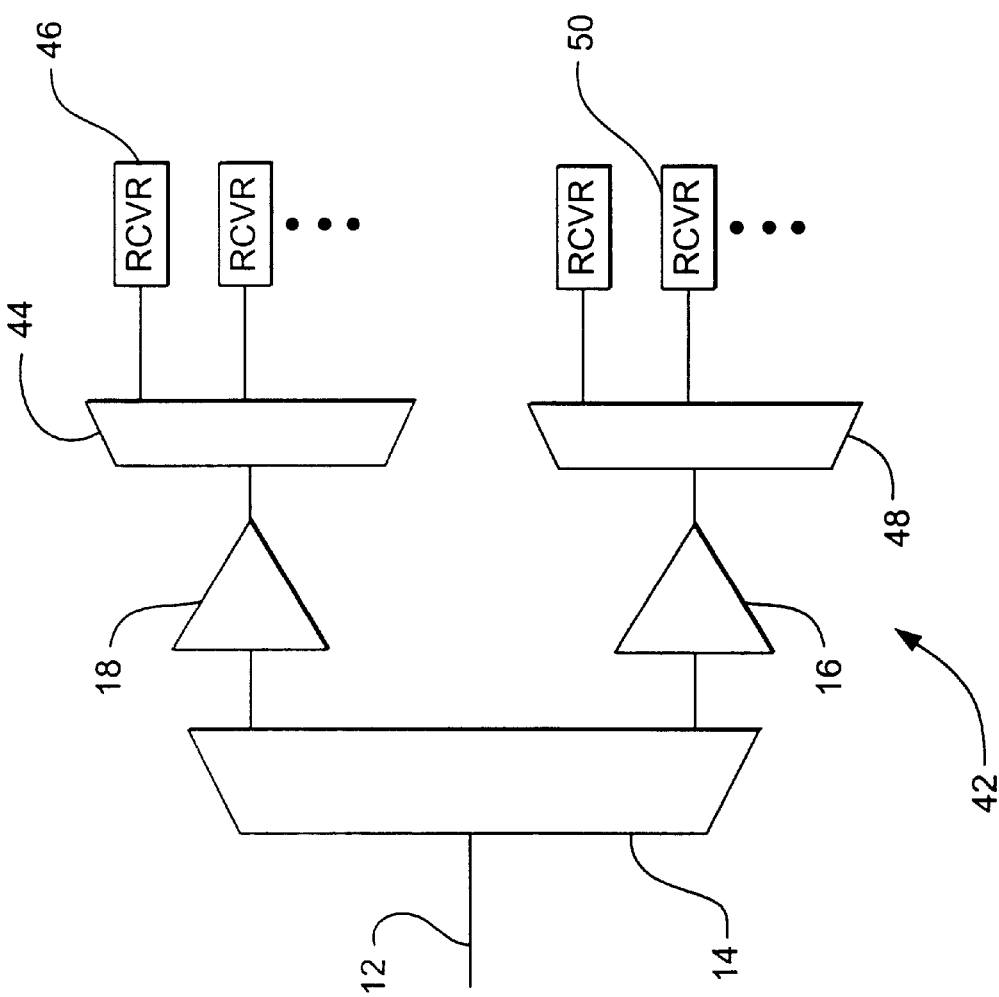
FIG. 4(a) is a schematic diagram of one embodiment of a broadband pre-amplifier of the present invention.
Figure 4B:
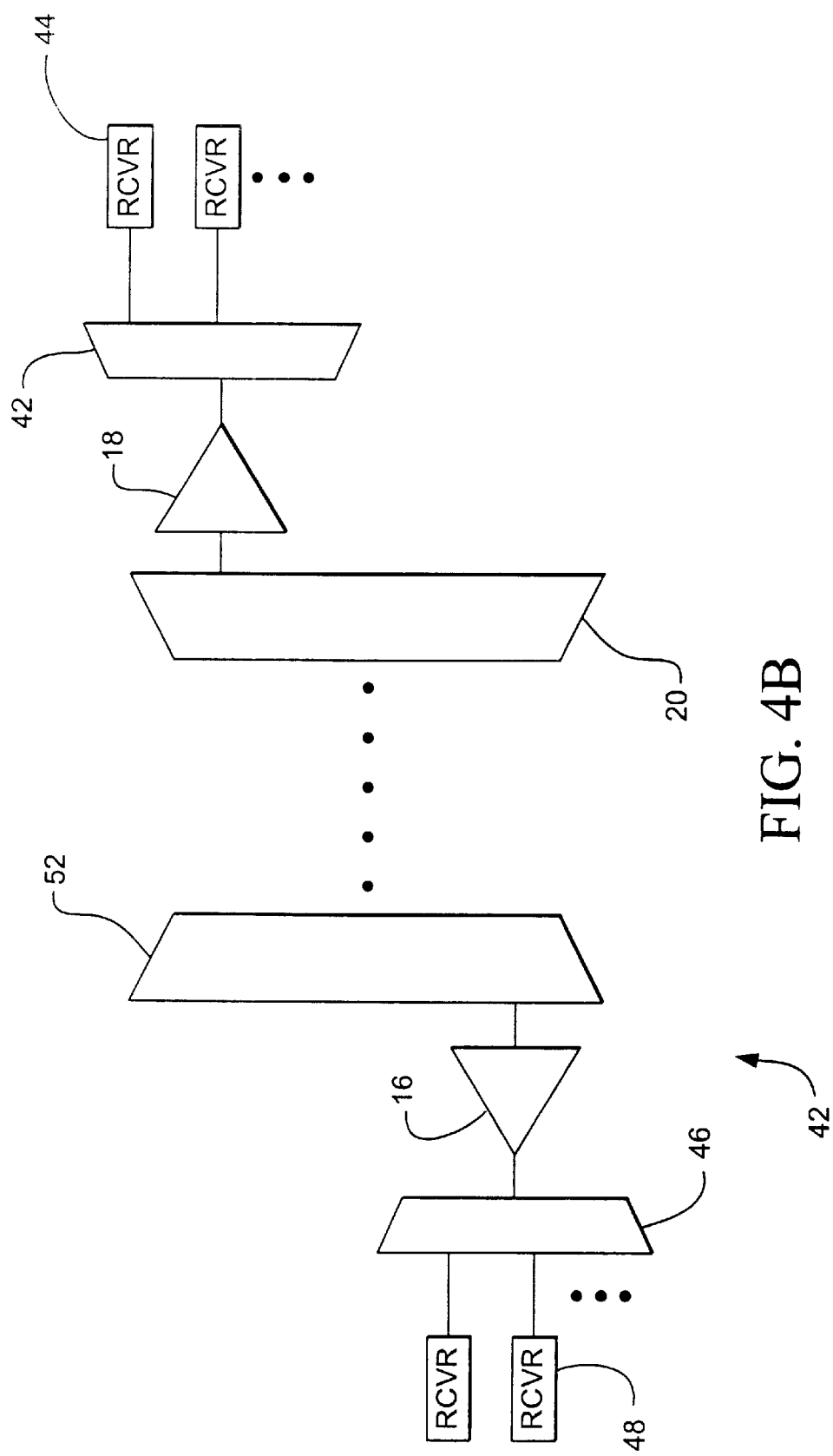
FIG. 4(b) is a schematic diagram of another embodiment of a broadband pre-amplifier of the present invention.

FIGS. 4(a) and 4(b) illustrate broadband pre-amplifier 42 embodiments of the present invention that include at least one input fiber 12 coupled to splitter 14. Splitter 14 splits an optical signal into at least a first wavelength and a second wavelength, wherein a transition from a stop band to a pass band of the splitter occurs preferably in 20 nm or less, more preferably 15 nm or less and still more preferably in 10 nm or less. Raman amplifier 16 and rare-earth doped optical amplifier are coupled to splitter 14. A splitter 44 is coupled to a first plurality of receivers 46 and rare-earth doped optical amplifier 18. A splitter 48 is coupled to a second plurality of receivers 50 and Raman amplifier 18. In FIG. 4(b), rare-earth doped amplifier 18 is coupled to combiner 20. Raman amplifier 16 is coupled to combiner 52.

In FIG. 4(a) Raman amplifier 16 and rare-earth doped amplifier 18 are arranged so that the first and second bands co-propagate In FIG. 4(b), Raman amplifier 16 and rare-earth doped amplifier 18 are arranged so that the first and second bands are counter-propagating.

In the embodiments illustrated in FIGS. 1(a) through 4(b), Raman amplifier 16 can be optimized for wavelengths between 1430 to 1530 nm. Rare-earth doped optical amplifier 18 can be optimized for wavelengths between 1530 to 1620 nm. Rare-earth doped optical amplifier 18 is preferably doped with erbium, thulium, telluride, preseodenium.

Additional elements can be included with any of the amplifiers 10 and 11 of FIG. 1(a) through FIG. 4(b). Such elements include but not limited to gain equalizers, add/drop multiplexers, dispersion compensating elements and the like, all of which can be positioned in and around the amplifier. Suitable gain equalizers include but are not limited to long period gratings, Mach-Zehnder interferometer filters, dielectric filters and the like. Suitable add/drop multiplexers include but are not limited to gratings and circulators, gratings in Mach-Zehnder interferometers and dielectric filters. Suitable dispersion compensating elements include but are not limited chirped gratings and circulators and dispersion compensating fibers. Amplifiers 10 and 11 can be included in multi-stage sub-systems, have more than two amplifiers in parallel configurations and be discrete or distributed amplifiers.

The present invention is also a broadband communication system. Referring now to FIGS. 5(a) and 5(b), amplifiers 10 and 11 can be coupled with any type of transmitter and receiver. As illustrated, broadband communication system 54 includes a transmitter 56 coupled to input fiber 12. A receiver 58 is coupled to output fiber 22 which in turn is coupled to combiner 20. Transmitter 56 can be a semiconductor laser as well as other types of lasers and devices that emit wavelengths. Receiver 58 can be a detector coupled with electronic circuitry. In FIG. 5(a) Raman amplifier 16 and rare-earth doped optical amplifier 18 are arranged so that the first and second bands co-propagate, while in FIG. 5(b) they are arranged so that the first and second bands counter-propagate.

Figure 6A:
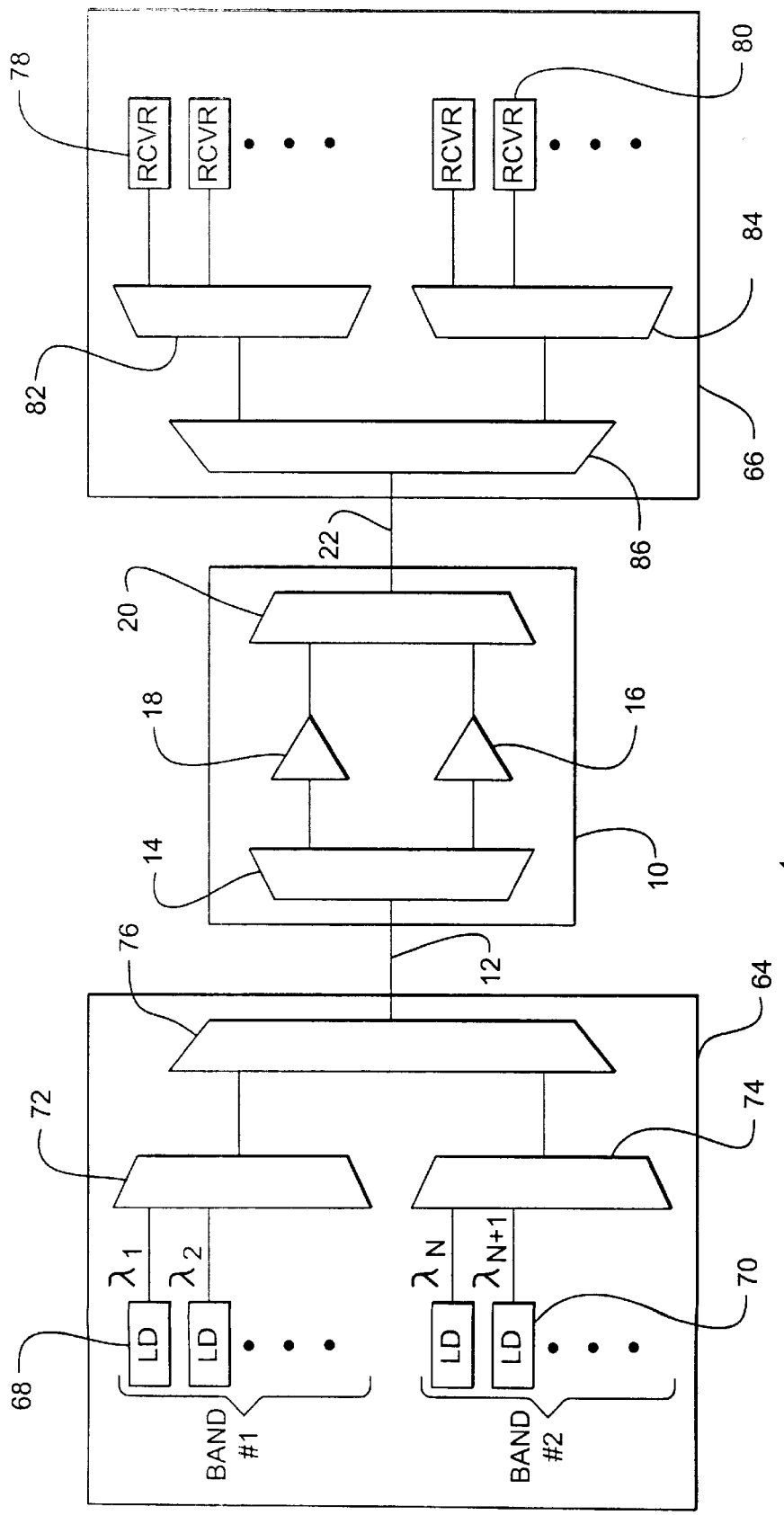
Figure 6B:
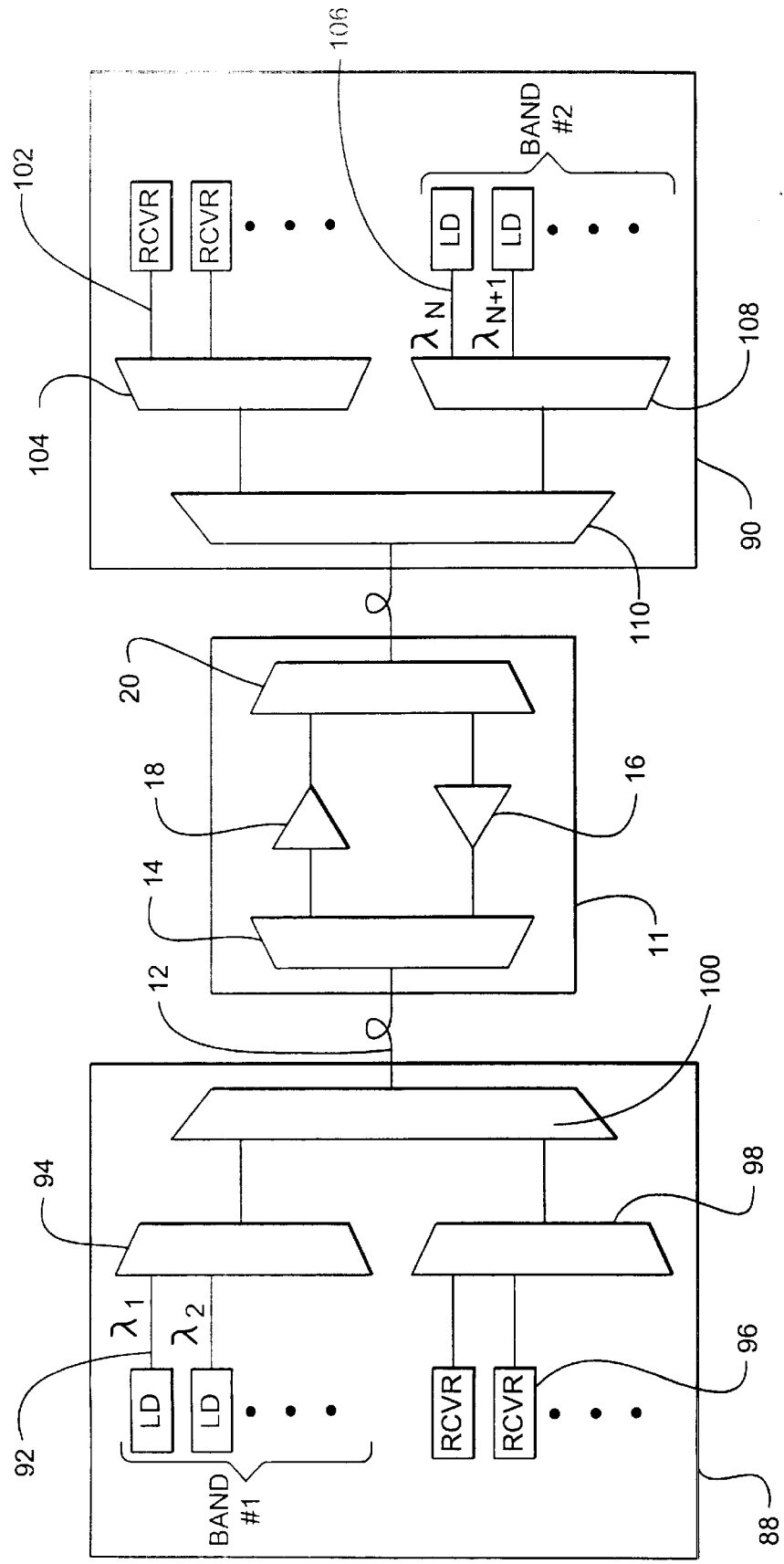

FIGS. 6(a) and 6(b) illustrate other embodiments of broadband communication systems 60 and 62, respectively with in-line amplifiers coupled to transmitter and receiver assemblies. Broadband communication system 60 includes broadband amplifier 10 coupled to a transmitter assembly 64 and a receiver assembly 66. Transmitter assembly 64 includes a first plurality of transmitters 68 that emits a first band of wavelengths, and a second plurality of transmitters 70 that transmit a second band of wavelengths each coupled to a combiner 72 and 74, respectively. The first and second bands co-propagate. Combiners 72 and 74 in turn are coupled to a combiner 76. Combiner 76 is coupled to broadband amplifier 10. Receiver assembly 66 includes a first plurality of receivers 78 and a second plurality of receivers 80, each coupled to a splitter 82 and 84, respectively. Splitters 82 and 84 are coupled to a splitter 86 which is then coupled to broadband amplifier 10.

In FIG. 6(b), amplifier 11 is coupled to a transmitter/receiver assembly 88 and a transmitter receiver assembly 90. Transmitter/receiver assembly 88 includes a first plurality of transmitters 92 coupled to a combiner 94. First plurality of transmitters 92 emits a first band of wavelengths. A first plurality of receivers 96 is coupled to a splitter 98. Combiner 94 and splitter 98 are coupled to a combiner 100 which in turn is coupled to amplifier 11. Transmitter/receiver assembly 90 includes a second plurality of receivers 102 coupled to a splitter 104 and a second plurality of transmitters 106 that transmit a second band of wavelengths. Second plurality of transmitters 106 is coupled to a combiner 108. Splitter 104 and combiner 108 are coupled to a splitter 110 which in turn is coupled to broadband amplifier 11. In the embodiment of FIG. 6(b) the two bands counter-propagate.

Figure 7A:
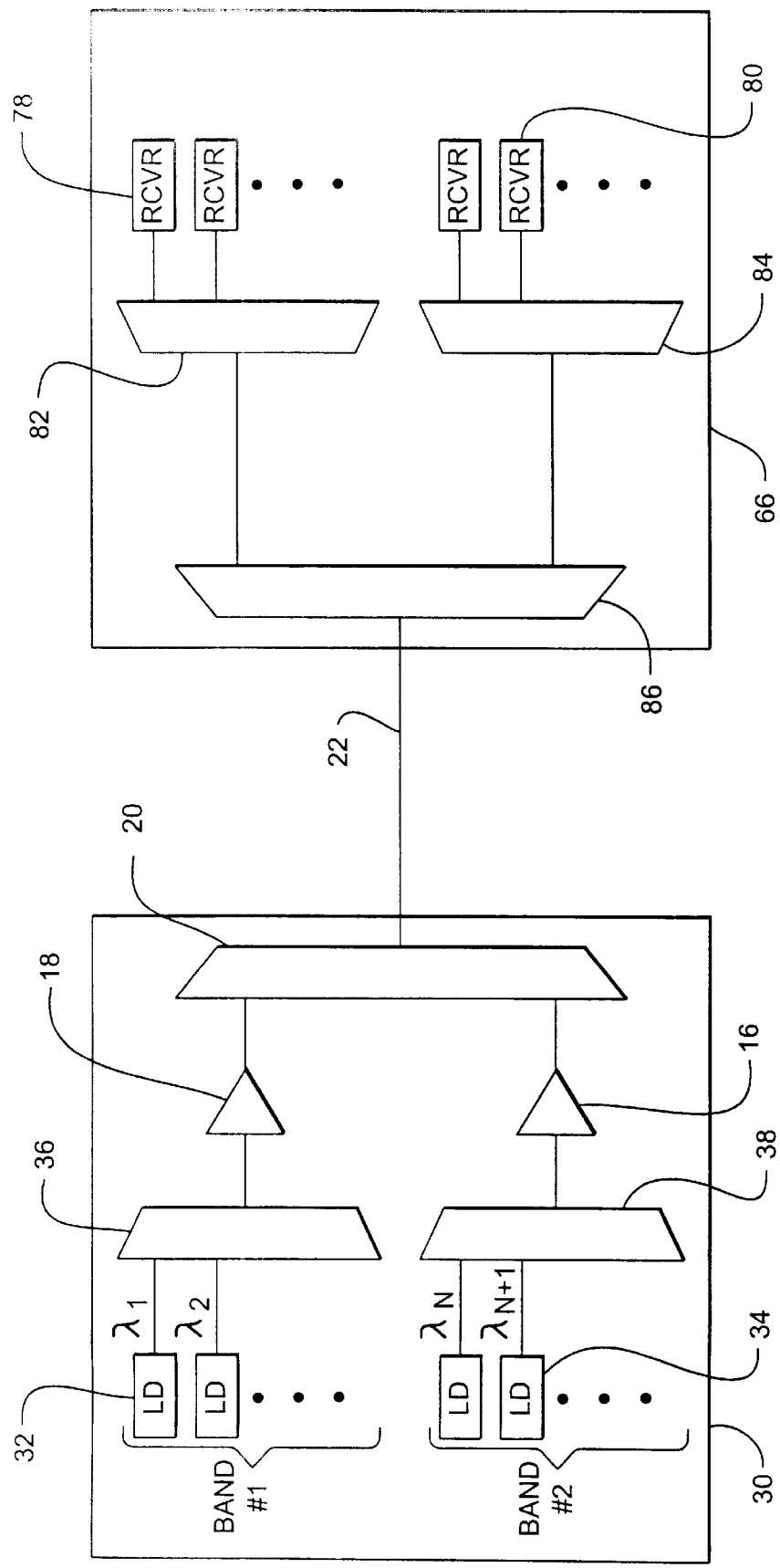
Figure 7B:
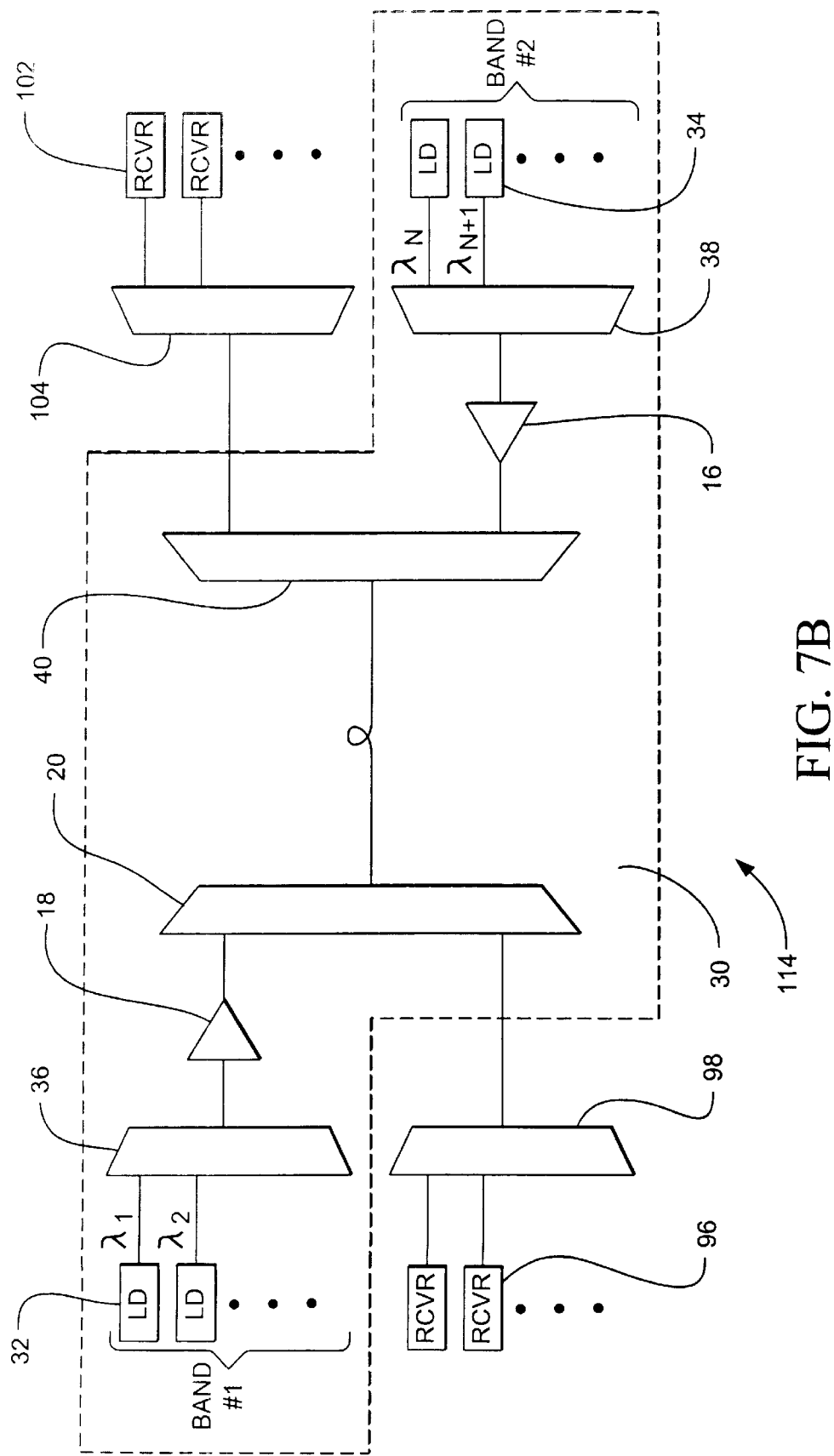

As illustrated in FIGS. 7(a) and 7(b) booster amplifiers are connected to a transmission line and a receiver assembly. A broadband communication system 112, illustrated in FIG. 7(a) includes broadband booster amplifier 30 coupled to receiver assembly 66. In this embodiment, the first and second bands co-propagate.

Broadband communication system 114, illustrated in FIG. 7(b) includes broadband booster amplifier 30 coupled to splitter 98 and splitter 104. First plurality of receivers 96 is coupled to splitter 98. Second plurality of receivers 102 is coupled to splitter 104. Splitter 98 is coupled to combiner 20, and splitter 104 is coupled to combiner 40. The two bands of broadband communication system 114 counter-propagate.

Figure 8A:
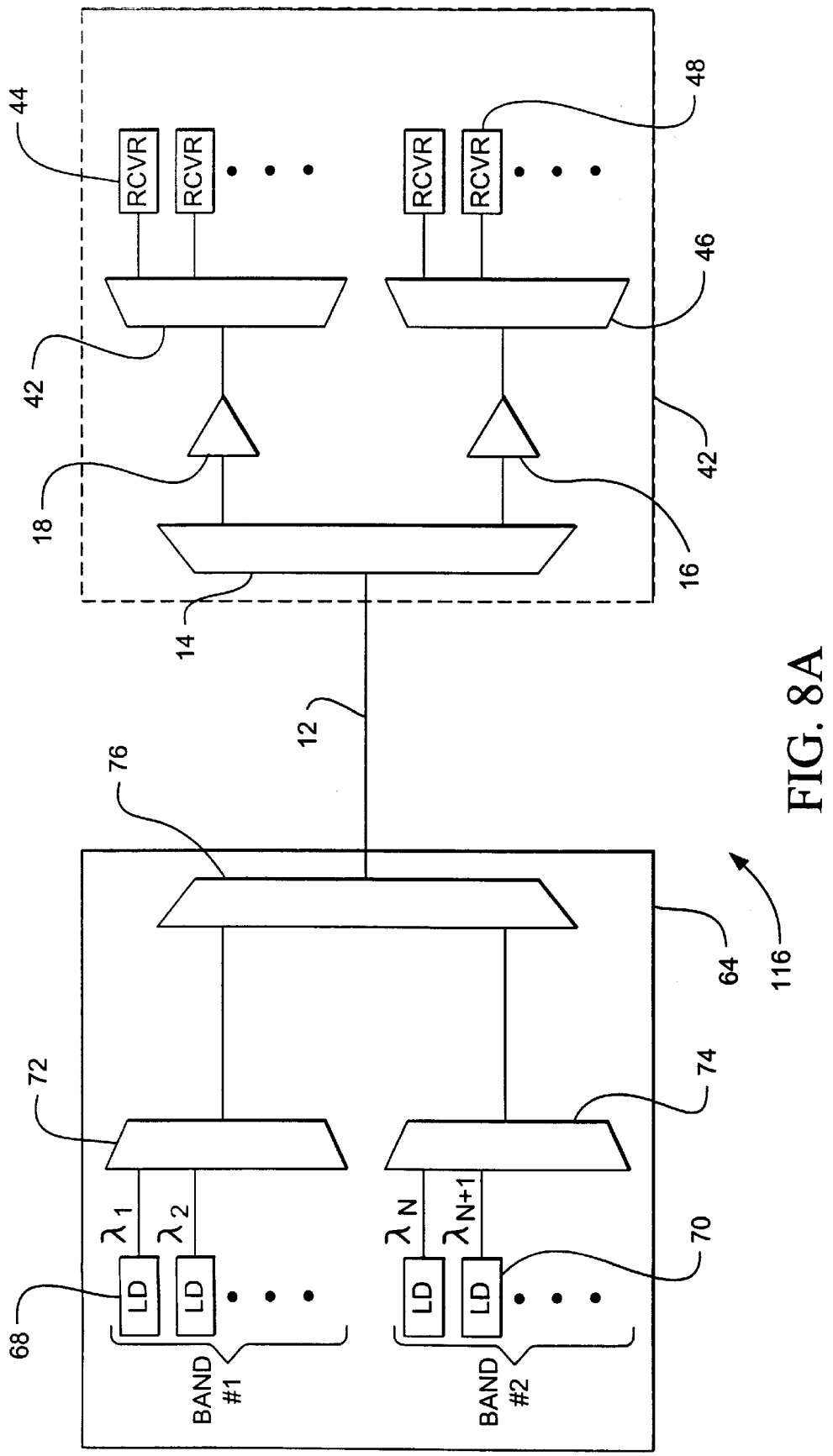
Figure 8B:
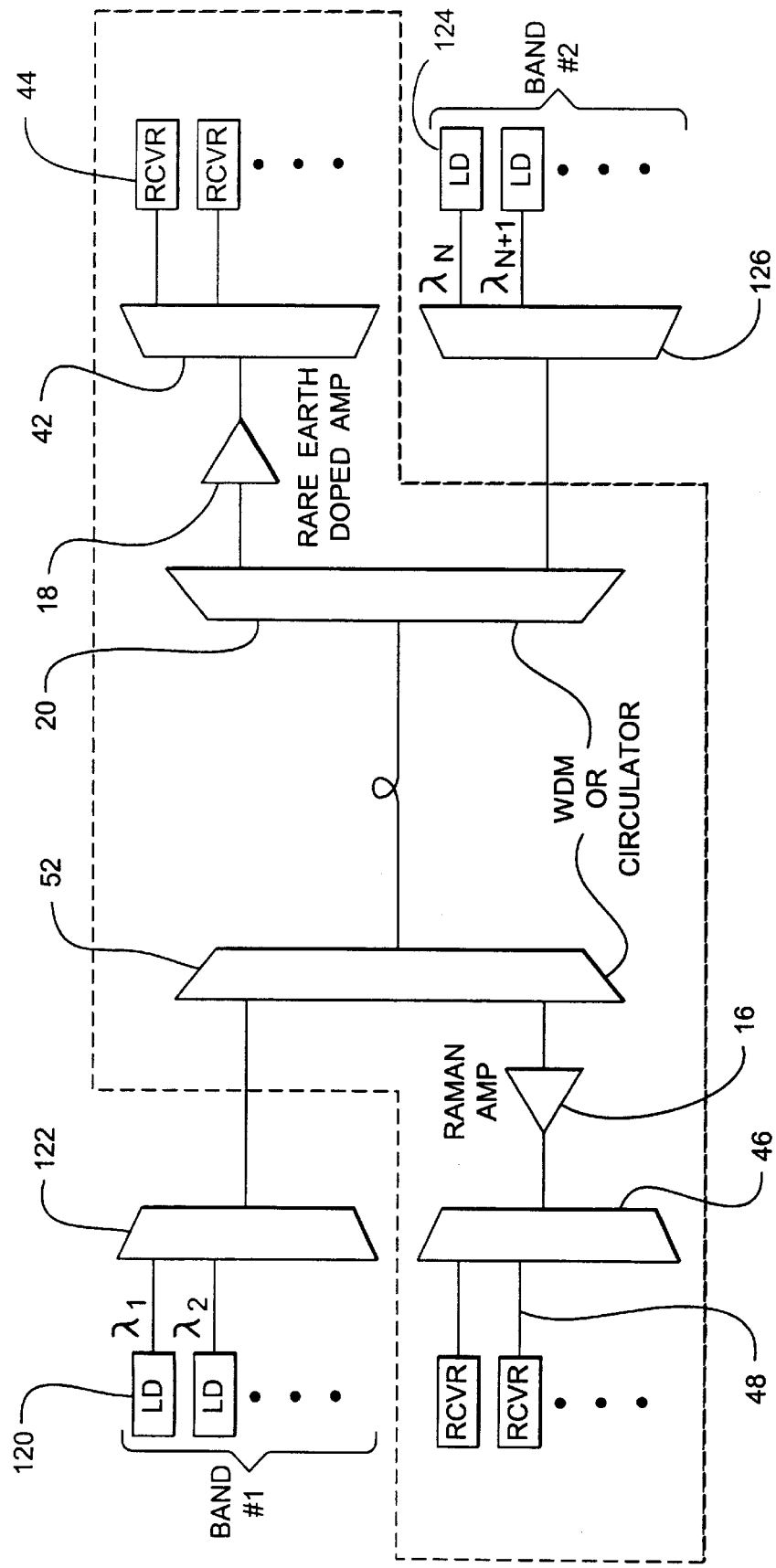

FIGS. 8(a) and 8(b) illustrate pre-amplifiers connected to a transmission line and a transmitter assembly. Broadband communication system 116, illustrated in FIG. 8(a) includes transmitter assembly 64 which is coupled to broadband pre-amplifier 42. The first and second band co-propagate.

Broadband communication system 118, illustrated in FIG. 8(b) includes first plurality of transmitters 120 which transmit a first band of wavelengths. First plurality of transmitters 120 is coupled to a combiner 122. A second plurality of transmitters 124 transmit a second band of wavelengths. Second plurality of transmitters 124 is coupled to combiner 126. Combiner 122 and combiner 126 are each coupled to broadband pre-amplifier 42. The two bands counter-propagate with broadband communication system 118.

Figure 9A:
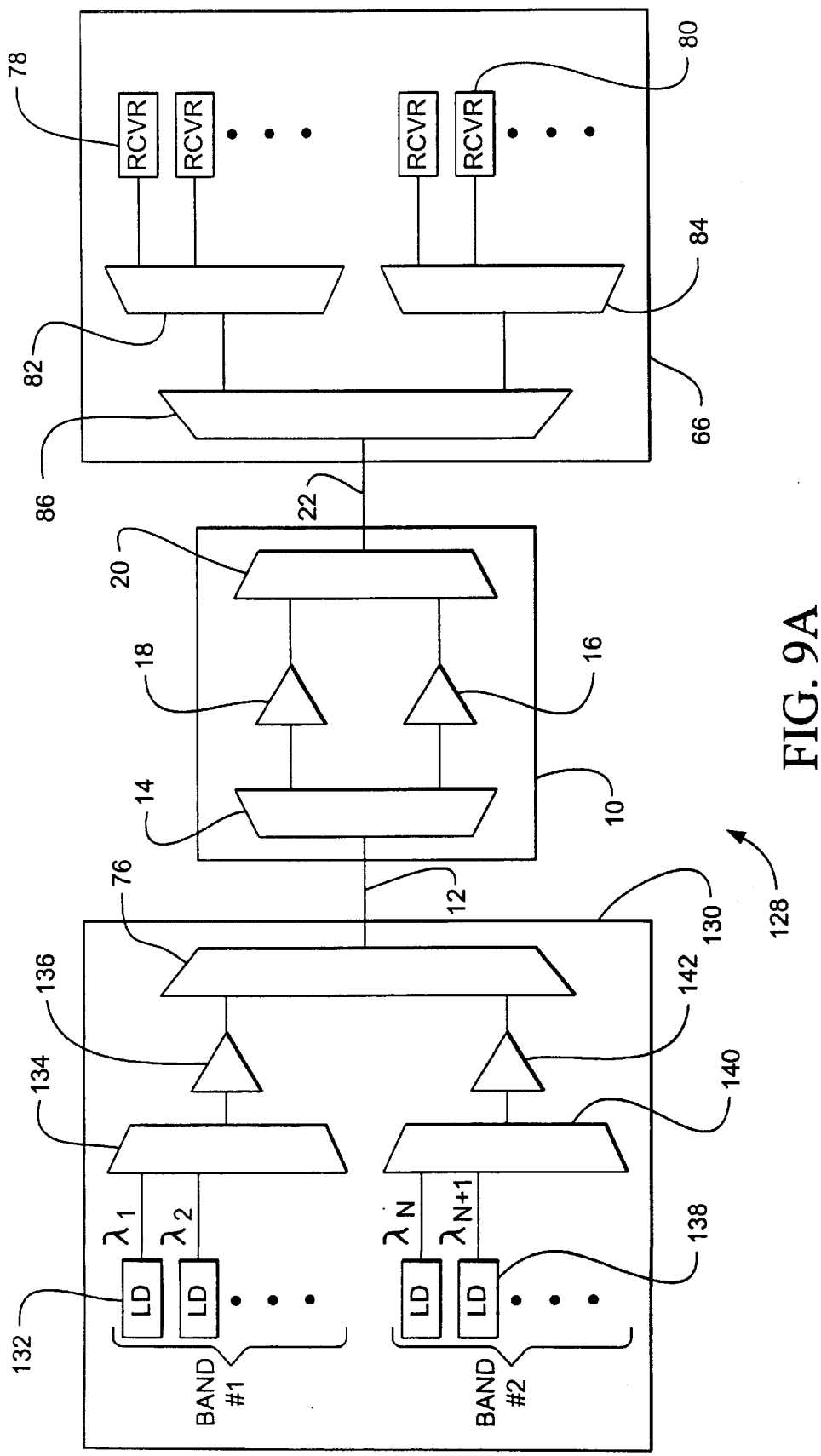
Figure 9B:
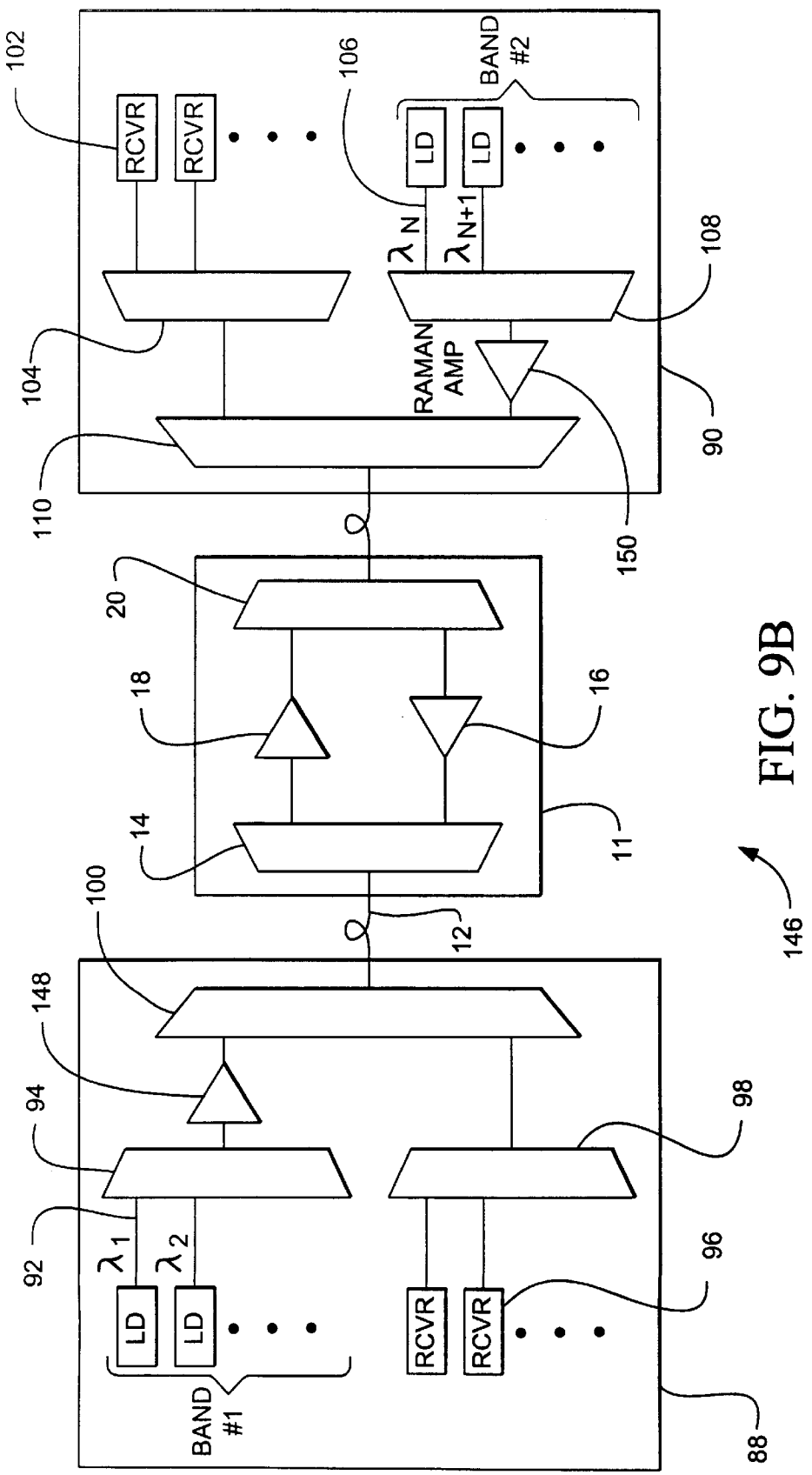

Referring to FIGS. 9(a) and 9(b) a booster amplifier and an in-line amplifier are connected to a transmission line and a receiver assembly. Broadband communication system 128, illustrated in FIG. 9(a), includes a booster/amplifier assembly 130 and receiver assembly 66, each coupled to amplifier 10. Booster/amplifier assembly 130 includes a first plurality of transmitters 132, a combiner 134, a rare-earth doped amplifier 136, a second plurality of transmitters 138, a combiner 140, a Raman amplifier 142 and a combiner 144. First plurality of transmitters 132 emits a first band of wavelengths, and second plurality of transmitters 138 emits a second band of wavelengths. The first and second band of wavelengths co-propagate. Combiner 144 and splitter 86 are each coupled to amplifier 10.

Broadband communication system 146, illustrated in FIG. 9(b), includes a rare-earth doped amplifier 148 coupled to transmitter/receiver assembly 88. Also included is a Raman amplifier 150 coupled to transmitter/receiver assembly 90. Combiner 100 and splitter 110 are each coupled to amplifier 11. The first and second bands counter-propagate with broadband communication system 146.

Figure 10A:
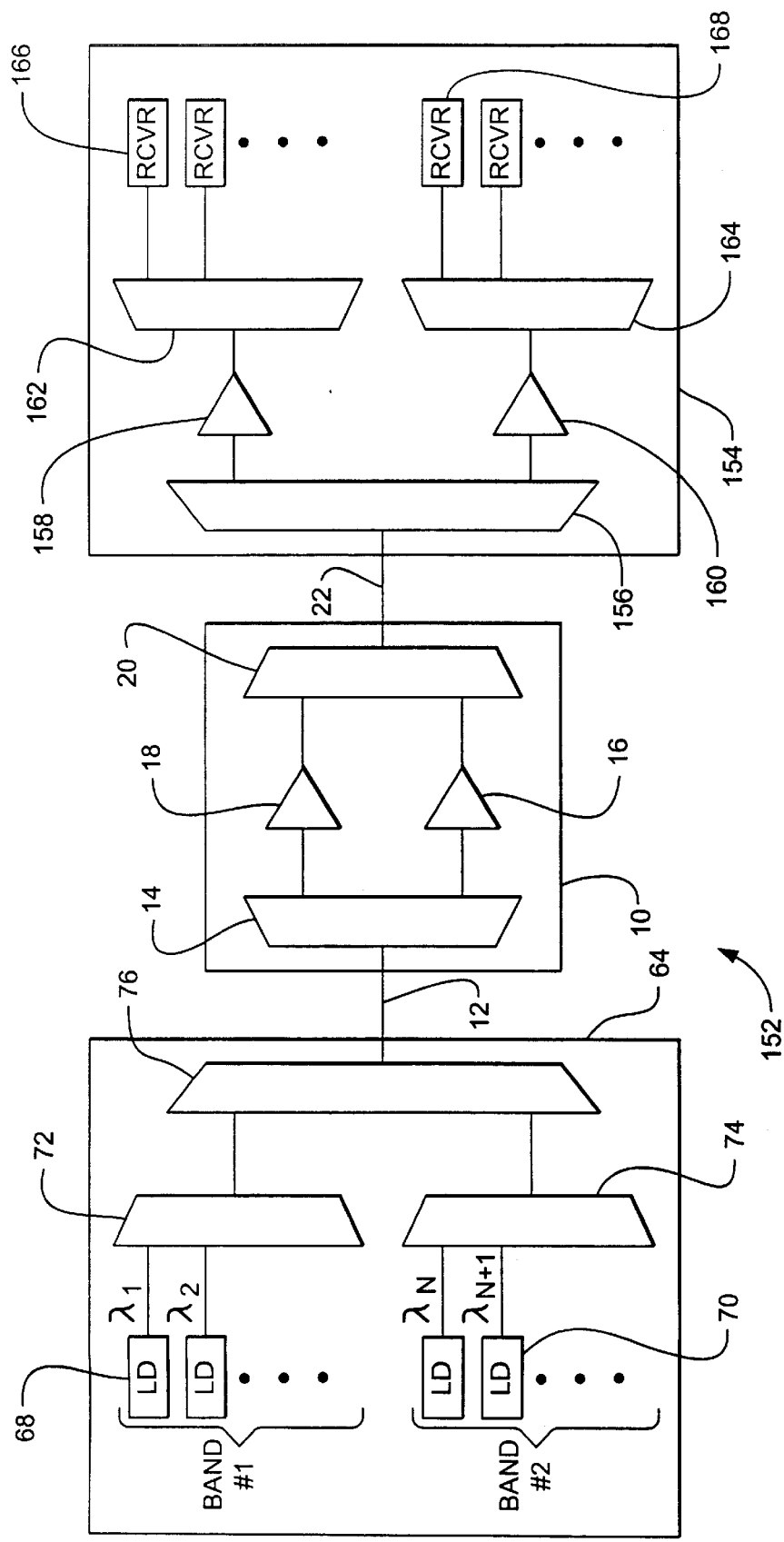
Figure 10B:
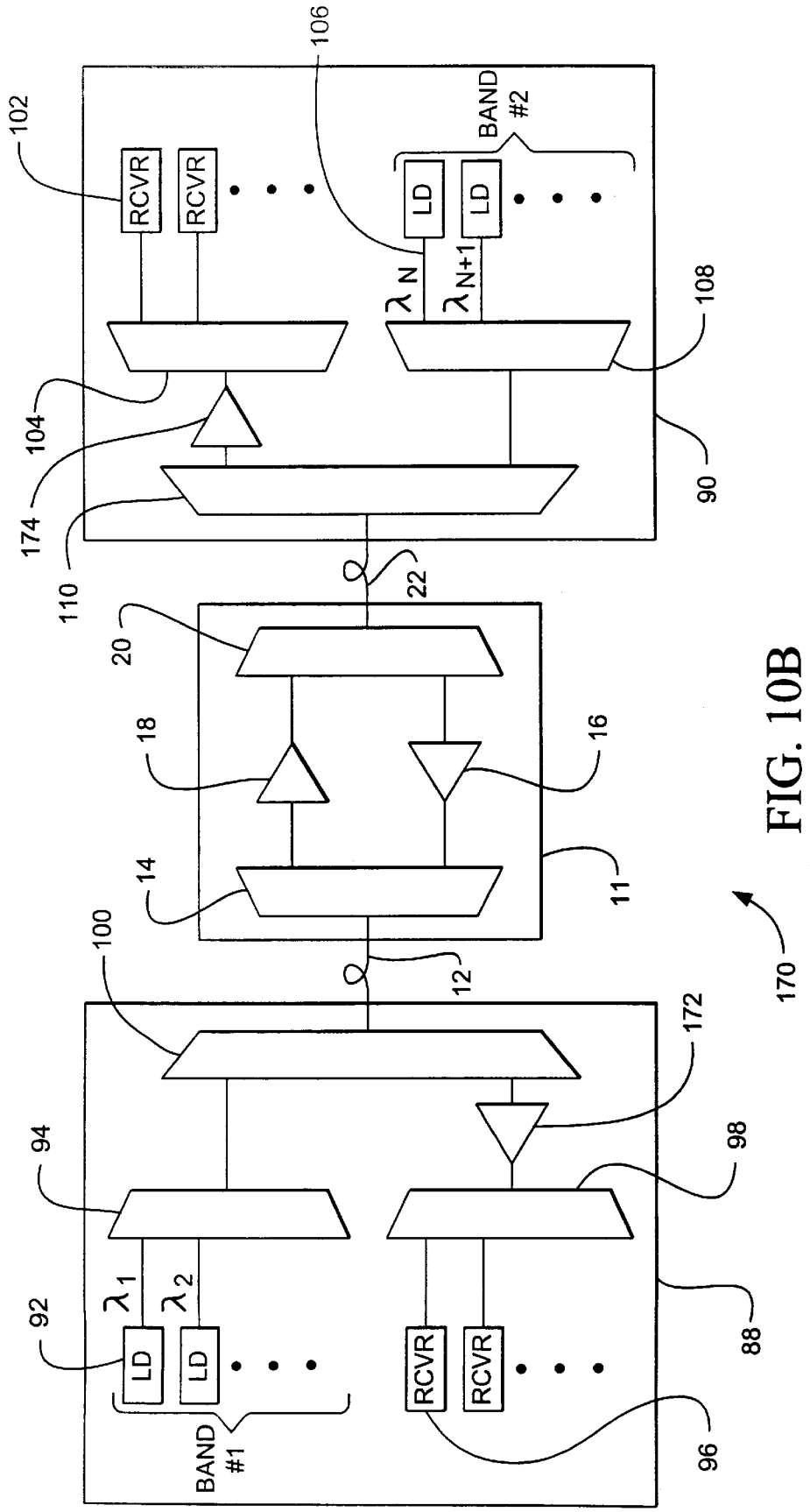

Referring now to FIG. 10(a) and 10(b), pre-amplifiers and in-line amplifiers are connected to transmission lines and transmitter assemblies. In FIG. 10(a) a broadband communication system 152 includes transmitter assembly 64 and a receiver assembly 154 that are both coupled to amplifier 10. Receiver assembly 154 includes a splitter 156, a rare-earth doped amplifier 158, a Raman amplifier 160, splitters 162 and 164 as well as first and second pluralities of receivers 166 and 168. Rare-earth doped amplifier 158 is coupled to splitters 156 and 162. Raman amplifier 160 is coupled to splitters 156 and 164. The first and second bands co-propagate.

Broadband communication system 170, illustrated in FIG. 10(b), includes a Raman amplifier 172 coupled to transmitter/receiver assembly 88. Raman amplifier 172 is coupled to splitter 98 and combiner 100. A rare earth doped optical amplifier 174 is coupled to transmitter/receiver assembly 90. Rare-earth doped optical amplifier 174 is coupled to splitters 104 and 110. Splitter 110 and combiner 100 are each coupled to amplifier 11. The first and second bands counter-propagate.

Figure 11A:
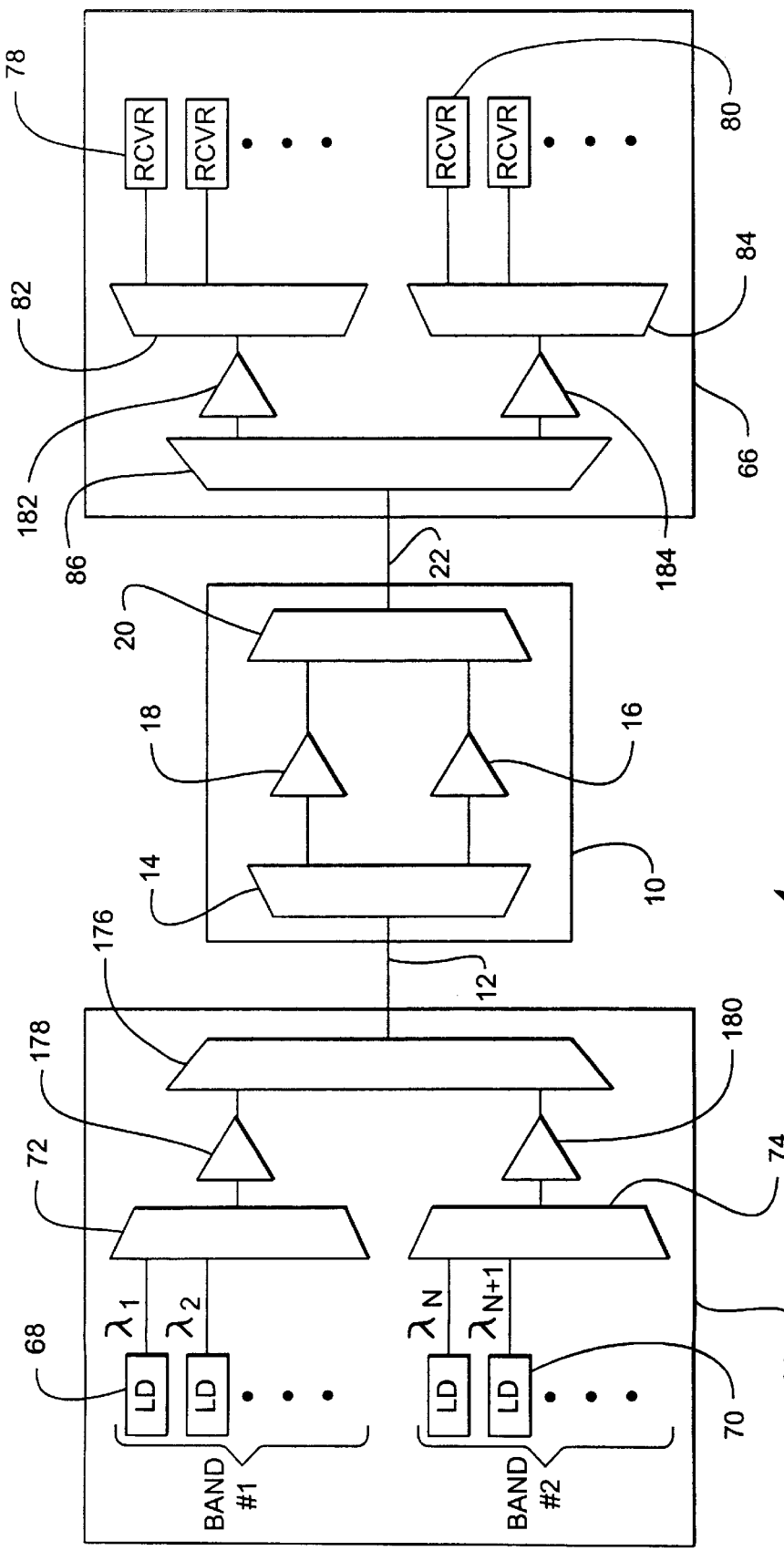
Figure 11B:
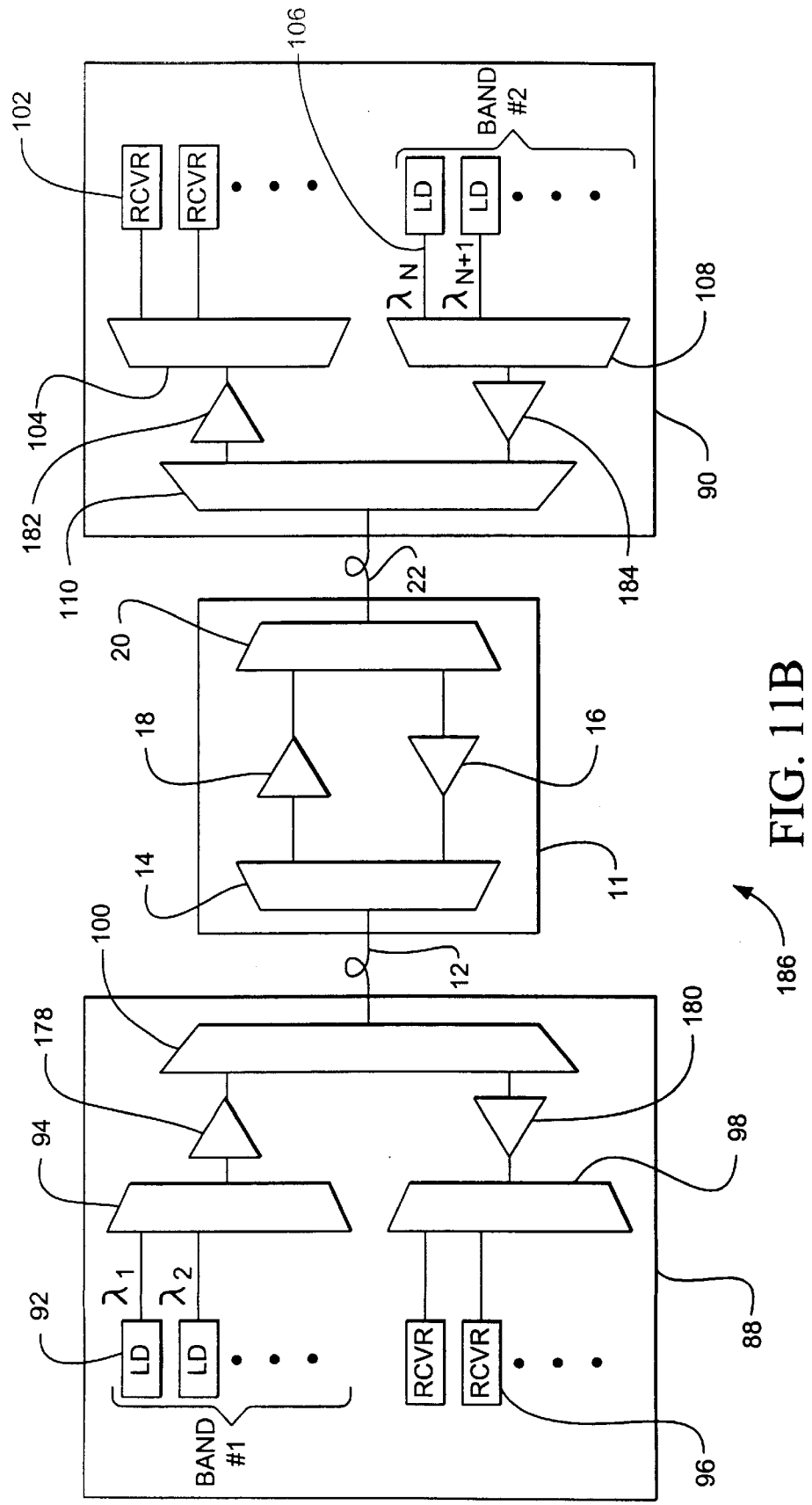

In FIGS. 11(a) and 11(b), a booster amplifier, in-line amplifier and preamplifier are connected to a transmission line. Broadband communication system 176, illustrated in FIG. 11(a), includes a rare-earth doped amplifier 178 and a Raman amplifier 180 that are coupled to transmitter assembly 64. Rare-earth doped amplifier 178 is coupled to combiners 72 and 76. Raman amplifier 180 is coupled to combiners 74 and 76. Combiner 76 is coupled to splitter 14 of amplifier 10. Receiver assembly 154 is coupled to combiner 20 of amplifier 10. A rare-earth doped amplifier 182 and a Raman amplifier 184 are coupled to receiver assembly 66. Rare-earth doped optical amplifier 182 is coupled to splitters 86 and 82. Raman amplifier 184 is coupled to splitters 84 and 86. Splitter 86 and combiner 76 are coupled to amplifier 10. The first and second bands copropagate.

Referring now to FIG. 11(b), a broadband communication system 186 includes a rare-earth doped optical amplifier 178 and Raman amplifier 180 coupled to transmitter/receiver assembly 88. Rare-earth doped optical amplifier 178 is coupled to combiners 94 and 100. Raman amplifier 180 is coupled to splitter 98 and combiner 100. Rare-earth doped amplifier 182 and Raman amplifier 184 are coupled to transmitter/receiver assembly 90. Rare-earth doped optical amplifier is coupled to splitters 104 and 110. Raman amplifier 184 is coupled to combiner 108 and splitter 110. Splitter 110 and combiner 100 are coupled to amplifier 11. The first and second bands counter-propagate.

The broadband communication systems illustrated in FIGS. 5(a) through 11(b) can employ a variety of different optical fibers including but not limited to standard fiber, DSF, non-zero dispersion shifted fiber (NZ-DSF), and the like. Standard fiber has a zero dispersion wavelength near 1310 nm. The zero dispersion wavelength of DSF is near 1550 nm. NZ-DSF has different zero dispersion wavelengths, depending on the manufacturer. The broadband communication systems of the present invention can designed to be dispersion managed systems with fibers that have different amounts of dispersion spliced together to make a system that has locally high dispersion and globally low dispersion. Further, the broadband communication systems of the present invention have utility in undersea cable systems, wide area networks (WAN), metropolitan area networks (MAN) and local area networks (LAN). Switches, cross-connects, routers, restoration switches and add/drop multiplexers can be included with any of the broadband communication systems of the present invention.

The present invention is also a method of broadband amplification that uses any of the FIG. 1(a) through FIG. 11(b) amplifiers or systems. In this embodiment an optical signal of wavelength of 1430 nm to 1620 nm is divided at a preselected wavelength into a first beam and a second beam. The first beam is directed to at least one optical amplifier and produces an amplified first beam. The second beam is directed to at least one rare earth doped fiber amplifier to produce an amplified second beam. The first and second amplified beams are combined.

In another embodiment of the present invention, a method of transmitting WDM wavelengths, in any of the FIG. 5(a) through FIG. 11(b) broadband communication systems, includes propagating a plurality of WDM wavelengths from a transmitter assembly along a transmission line. At least a portion of the WDM wavelengths are in the wavelength range of 1430 to 1530 nm. At least a portion of the plurality of wavelengths are amplified with a Raman amplifier assembly to create a plurality of amplified WDM wavelengths. The plurality of amplified WDM wavelengths are received at a receiver assembly. At least a portion of the WDM wavelengths can be in the wavelength range of 1530 to 1570 nm. 1570 to 1630 nm or both.

In another embodiment of the present invention, a method of transmitting WDM wavelengths, in any of the FIG. 5(a) through FIG. 11(b) broadband communication systems, propagates a first plurality of WDM wavelengths in the wavelength range of 1530 to 1620 from a transmitter assembly along a transmission line. A second plurality of WDM wavelengths in the wavelength range of 1430 to 1530 is introduced to the transmission line. The second plurality of WDM wavelengths are amplified by Raman amplification after the second plurality of WDM wavelengths are introduced to the transmission line. The first and second pluralities of WDM wavelengths are received at a receiver assembly.

In another embodiment of the present invention, a method of transmitting WDM wavelengths, in any of the FIG. 5(a) through FIG. 11(b) broadband communication systems, propagates a plurality of WDM wavelengths from a transmitter assembly along a transmission line. At least a portion of the plurality of WDM wavelengths are in the wavelength range of 1430 to 1530 nm. A portion of the plurality of wavelengths are amplified with a Raman amplifier assembly to create a plurality of amplified WDM wavelengths that are received at a receiver assembly.

In another embodiment of the present invention, a method of transmitting WDM wavelengths, in any of the FIG. 5(a) through FIG. 11(b) broadband communication systems propagates a first plurality of WDM wavelengths in the wavelength range of 1530 to 1620 from a transmitter assembly along a transmission line. A second plurality of WDM wavelengths in the wavelength range of 1430 to 1530 are introduced to the transmission line. The second plurality of WDM wavelengths are amplified by Raman amplification after the second plurality of WDM wavelengths are introduced to the transmission line. The first and second pluralities of WDM wavelengths are received at a receiver assembly. The transmission line can be coupled to a Raman amplifier assembly that Raman amplifies the second plurality of WDM wavelengths.

In the methods of the present invention, the transmission can have a magnitude of dispersion of at least 5 ps/(nm)(km), be in the range of 1–5 ps/(nm)(km) or be less than 1 ps/(nm)(km). Raman amplifier assemblies of the methods of the present invention can include a discrete Raman amplifier inserted into the transmission line. The Raman amplifier assembly can include a distributed Raman amplifier and a discrete Raman amplifier. Additionally, the Raman amplifier assembly can include a dispersion compensating fiber with a magnitude of dispersion of at least 50 ps/(nm)(km). At least a portion of the gain of the Raman amplifier assembly can be in the dispersion compensating fiber.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of broadband amplification, comprising:
   dividing an optical signal with wavelength of 1430 nm to 1620 nm at a preselected wavelength into a first beam and a second beam;
   directing the first beam to a Raman amplifier assembly that includes a dispersion compensating fiber with a magnitude of dispersion of at least 50 ps/(nm)(km) to produce an amplified first beam;
   directing the second beam to at least one rare earth doped fiber amplifier and produce an amplified second beam; and
   combining the first and second amplified beams.

2. The method of claim 1, wherein the Raman amplifier assembly includes a Raman amplifier.

3. The method of claim 1, wherein the Raman amplifier assembly is coupled to a transmission line.

4. The method of claim 3, wherein the transmission line has a magnitude of dispersion of at least 5 ps/(nm)(km).

5. The method of claim 3, wherein the transmission line has a magnitude of dispersion in the range of 1–5 ps/(nm)(km).

6. The method of claim 3, wherein the transmission line has a magnitude of dispersion less than 1 ps/(nm)(km).

7. The method of claim 3, wherein the Raman amplifier assembly includes a discrete Raman amplifier inserted into the transmission line.

8. The method of claim 1, wherein the Raman amplifier assembly includes a discrete Raman amplifier and a distributed Raman amplifier.

9. The method of claim 1, wherein at least a portion of the gain of the Raman amplifier assembly is in the dispersion compensating fiber.

10. A method of transmitting WDM wavelengths in a broadband communication system, comprising:
    propagating a plurality of WDM wavelengths from a transmitter assembly along a transmission line;
    amplifying at least a portion of the plurality of wavelengths with a Raman amplifier assembly that includes a distributed Raman amplifier and a discrete Raman amplifier, at least a portion of the amplifier assembly including a dispersion compensating fiber with magnitude of dispersion of at least 50 ps/(nm)(km) to create a plurality of amplified WDM wavelengths; and
    receiving the plurality of amplified WDM wavelengths at a receiver assembly.

11. The method of claim 10, at least a portion of the WDM wavelengths are in the wavelength range of 1530 to 1570 nm.

12. The method of claim 10, at least a portion of the WDM wavelengths are in the wavelength range of 1570 to 1630 nm.

13. The method of claim 10, at least a portion of the WDM wavelengths are in the wavelength range of 1530 to 1570 nm and in the wavelength range of 1570 to 1630 nm.

14. The method of claim 10, wherein the transmission line has a magnitude of dispersion of at least 5 ps/(nm)(km).

15. The method of claim 10, wherein the transmission line has a magnitude of dispersion in the range of 1–5 ps/(nm)(km).

16. The method of claim 10, wherein the transmission line has a magnitude of dispersion less than 1 ps/(nm)(km).

17. A method of transmitting WDM wavelengths in a broadband communication system, comprising:
    propagating a first plurality of WDM wavelengths in the wavelength range of 1530 to 1620 from a transmitter assembly along a transmission line;
    introducing a second plurality of WDM wavelengths in the wavelength range of 1430 to 1530 to the transmission line;
    amplifying the second plurality of WDM wavelengths by Raman amplification in a Raman amplifier assembly that includes a dispersion compensating fiber with a magnitude of dispersion of at least 50 ps/(nm)(km) after the second plurality of WDM wavelengths are introduced to the transmission line;
    receiving the first and second pluralities of WDM wavelengths at a receiver assembly.

18. The method of claim 17, wherein the transmission line has a magnitude of dispersion of at least 5 ps/(nm)(km).

19. The method of claim 17, wherein the transmission line has a magnitude of dispersion in the range of 1–5 ps/(nm)(km).

20. The method of claim 17, wherein the transmission line has a magnitude of dispersion less than 1 ps/(nm)(km).

21. The method of claim 15, wherein the Raman amplifier assembly includes a discrete Raman amplifier inserted into the transmission line.

22. The method of claim 17, wherein the Raman amplifier assembly includes a distributed Raman amplifier, wherein at least a portion of the gain of the distributed Raman amplifier is in the transmission line.

23. The method of claim 17, wherein the Raman amplifier assembly includes a distributed Raman amplifier and a discrete Raman amplifier.

24. The method of claim 17, wherein at least a portion of the gain of the Raman amplifier assembly is in the dispersion compensating fiber.

* * * * *